United States Patent
Lv et al.

(10) Patent No.: US 11,662,556 B2
(45) Date of Patent: May 30, 2023

(54) OPTICAL IMAGING LENS INCLUDING EIGHT LENSES OF ++−+−−+−, ++−+++−− OR ++−++−+− REFRACTIVE POWERS

(71) Applicant: ZHEJIANG SUNNY OPTICAL, CO., LTD, Zhejiang (CN)

(72) Inventors: Saifeng Lv, Zhejiang (CN); Fujian Dai, Zhejiang (CN); Liefeng Zhao, Zhejiang (CN)

(73) Assignee: ZHEJIANG SUNNY OPTICAL, CO., LTD, Zhejiang (CN)

( * ) Notice: Subject to any disclaimer, the term of this patent is extended or adjusted under 35 U.S.C. 154(b) by 291 days.

(21) Appl. No.: 16/932,878

(22) Filed: Jul. 20, 2020

(65) Prior Publication Data
US 2021/0096329 A1     Apr. 1, 2021

(30) Foreign Application Priority Data
Sep. 27, 2019   (CN) .......................... 201910924180.5

(51) Int. Cl.
    G02B 13/00     (2006.01)
    G02B 9/64      (2006.01)
(52) U.S. Cl.
    CPC ........... *G02B 13/0045* (2013.01); *G02B 9/64* (2013.01)
(58) Field of Classification Search
    CPC .............................. G02B 13/0045; G02B 9/64
    See application file for complete search history.

(56) References Cited

U.S. PATENT DOCUMENTS

2020/0249437 A1* 8/2020 Hirano ...................... G02B 9/64
2021/0048633 A1* 2/2021 Hirano ...................... G02B 9/64
2021/0396955 A1* 12/2021 Okano ............... G02B 13/0045

FOREIGN PATENT DOCUMENTS

| CN | 208521051 U | 2/2019 |
| CN | 109870788 A | 6/2019 |
| CN | 209215714 U | 8/2019 |
| TW | I570467 B | 2/2017 |

* cited by examiner

*Primary Examiner* — Wen Huang
(74) *Attorney, Agent, or Firm* — Gang Yu

(57) ABSTRACT

The disclosure discloses an optical imaging lens, which sequentially includes, from an object side to an image side along an optical axis, a first lens with refractive power, a second lens with positive refractive power, a third lens with negative refractive power, a fourth lens with refractive power, a fifth lens with refractive power, a sixth lens with refractive power, a seventh lens with refractive power and an eighth lens with negative refractive power. A distance on the optical axis from an object-side surface of the first lens to an imaging surface of the optical imaging lens TTL, ImgH is a half of diagonal length of an effective pixel region on the imaging surface of the optical imaging lens, ImgH and an Entrance Pupil Diameter (EPD) of the optical imaging lens meet TTL/(EPD×ImgH)<0.5 mm$^{-1}$.

15 Claims, 25 Drawing Sheets

OPTICAL IMAGING LENS INCLUDING EIGHT LENSES OF ++-+---+-, ++-+++-- OR ++-++-+- REFRACTIVE POWERS

CROSS-REFERENCE TO RELATED APPLICATION(S)

The disclosure claims priority to Chinese Patent Application No. 201910924180.5, filed on Sep. 27, 2019 and entitled "Optical Imaging Lens", the contents of which are hereby incorporated by reference in its entirety.

TECHNICAL FIELD

The disclosure relates to an optical imaging lens, and more particularly to an optical imaging lens including eight lenses.

BACKGROUND

In recent years, with the rapid development of communication technology, smart phones are changed more frequently. All terminal manufacturers focus on the camera function of mobile phones and keep putting forward new requirements on an imaging system. On the one hand, the market requires an imaging lens in the mobile phone to be thin and light to adapt to the development trend of ultra-thin mobile phones. On the other hand, the imaging lens is required to have the characteristics of large aperture and large image-side surface, so that the smart phones can adapt to shooting requirements under different environments of long shot and close shot.

SUMMARY

Some embodiments of the disclosure provides an optical imaging lens which may be applied to portable electronic products, and may at least solve or partially solve at least one of the above shortcomings in the prior art.

An aspect of the disclosure provides an optical imaging lens, which sequentially includes, from an object side to an image side along an optical axis, a first lens with refractive power, a second lens with positive refractive power, a third lens with negative refractive power, a fourth lens with refractive power, a fifth lens with refractive power, a sixth lens with refractive power, a seventh lens with refractive power and an eighth lens with negative refractive power.

In an exemplary embodiment, a distance TTL on the optical axis from an object-side surface of the first lens to an imaging surface of the optical imaging lens, ImgH is a half of diagonal length of an effective pixel region on the imaging surface of the optical imaging lens, ImgH and an Entrance Pupil Diameter (EPD) of the optical imaging lens meet $TTL/(EPD \times ImgH) < 0.5$ mm$^{-1}$.

In an exemplary embodiment, a total effective focal length f of the optical imaging lens, a curvature radius R8 of an image-side surface of the fourth lens and a curvature radius R9 of an object-side surface of the fifth lens meet $-2.0 < f/R8 + f/R9 < 0$.

In an exemplary embodiment, a curvature radius R7 of an object-side surface of the fourth lens and the curvature radius R8 of the image-side surface of the fourth lens meet $-1.0 < R7/R8 < 0$.

In an exemplary embodiment, an effective focal length f4 of the fourth lens and an effective focal length f3 of the third lens meet $f4/f3 < -1.5$.

In an exemplary embodiment, an effective focal length f7 of the seventh lens and an effective focal length f8 of the eighth lens meet $-1.5 < f7/f8 < 0$.

In an exemplary embodiment, the total effective focal length f of the optical imaging lens, a curvature radius R2 of an image-side surface of the first lens, and a curvature radius R1 of an object-side surface of the first lens meet $f/(R2-R1) \geq 5.0$.

In an exemplary embodiment, the total effective focal length f of the optical imaging lens and a curvature radius R4 of an image-side surface of the second lens meet $0 < f/R4 < 0.5$.

In an exemplary embodiment, a curvature radius R4 of an image-side surface of the second lens and a curvature radius R5 of an object-side surface of, the third lens meet $0 < (R4-R5)/(R4+R5) \leq 1.0$.

In an exemplary embodiment, a curvature radius R6 of an image-side surface of the third lens and a curvature radius R7 of an object-side surface of the fourth lens meet $-2.0 < (R6+R7)/(R6-R7) < -1.0$.

In an exemplary embodiment, the total effective focal length f of the optical imaging lens and a center thickness CT1 of the first, lens on the optical axis meet $6.0 \leq f/CT1 < 10$.

In an exemplary embodiment, an effective focal length f2 of the second lens and a center thickness CT2 of the second lens on the optical axis meet $6 < f2/CT2 < 15$.

In an exemplary embodiment, the total effective focal length f of the optical imaging lens, an effective focal length f5 of the fifth lens, and an effective focal length f6 of the sixth lens meet $0.5 \leq f/|f5| + f/|f6| < 1.0$.

In an exemplary embodiment, a distance T34 between the third lens and the fourth lens on the optical axis and a center thickness CT4 of the fourth lens on the optical axis meet $1 \leq T34/CT4 < 2$.

In an exemplary embodiment, a center thickness CT5 of the fifth lens on the optical axis and a distance T45 between the fourth lens and the fifth lens on the optical axis meet $1 \leq CT5/T45 < 5$.

In an exemplary embodiment, a center thickness CT6 of the sixth lens on the optical axis, a center thickness CT7 of the seventh lens on the optical axis and a center thickness CT8 of the eighth lens on the optical axis meet $0.45$ mm $< (CT6+CT7+CT8)/3 < 0.6$ mm.

In an exemplary embodiment, an abbe number V6 of the sixth lens and an abbe number V7 of the seventh lens meet $0.5 \leq V6/V7 < 2.0$.

In an exemplary embodiment, an abbe number V4 of the fourth lens, an abbe number V5 of the fifth lens and an abbe number V6 of the sixth lens meet $1 \leq |V4-V5|/V6 < 1.5$.

The optical imaging lens provided by the disclosure includes multiple lenses, for example, the first lens to the eighth lens. By reasonably setting the interrelationship between the total effective focal length of the optical imaging lens and the maximum field angle of the optical imaging lens, and optimizing the refractive power and surface shape of each lens, and combining them reasonably, the optical imaging lens may have a larger imaging surface when it is miniaturized and thin.

BRIEF DESCRIPTION OF THE DRAWINGS

Detailed descriptions are made to unrestrictive implementation modes below in combination with the drawings to make the other characteristics, purposes and advantages of the disclosure more apparent. In the accompanying drawings.

DETAILED DESCRIPTION OF THE EMBODIMENTS

Figure 1:
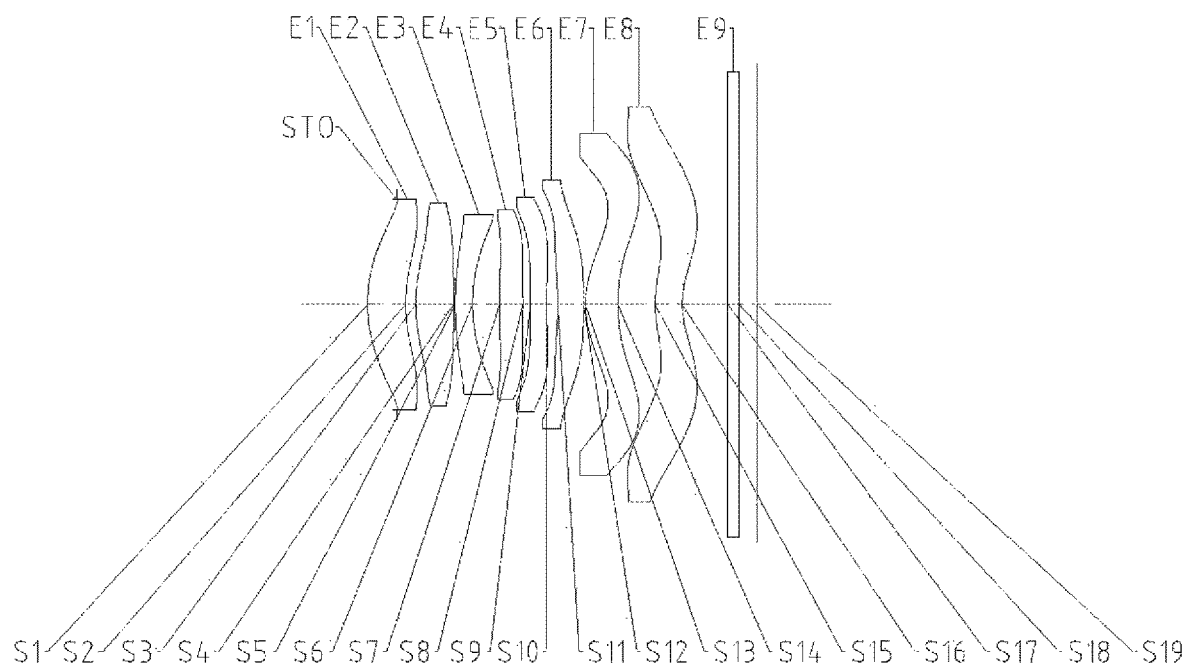
FIG. 1 is a structure diagram of an optical imaging lens according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or an aspherical shape shown in the drawings is shown by some embodiments. That is, the spherical shape or the aspherical shape is not limited to the spherical shape or the aspherical shape shown in the drawings. The drawings are by way of example only and not strictly to scale.

In the disclosure, a paraxial region refers to a region nearby an optical axis. If a lens surface is a convex surface and a position of the convex surface is not defined, it indicates that the lens surface is a convex surface at least in the paraxial region; and if the lens surface is a concave surface and a position of the concave surface is not defined, it indicates that the lens surface is a concave surface at least in the paraxial region. A surface of each lens closest to an object-side is called an object-side surface of the lens, and a surface of each lens closest to an imaging surface is called an image-side surface of the lens.

It is also to be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The characteristics, principles and other aspects of the disclosure will be described below in detail.

An optical imaging lens according to an exemplary implementation mode of the disclosure may include eight lenses with refractive power, i.e., a first lens, a second lens, a third lens, a fourth lens, a fifth lens, a sixth lens, a seventh lens and an eighth lens. The eight lenses are sequentially arranged from an object side to an image side along an optical axis. The adjacent lenses may have air space between them.

In an exemplary implementation mode, the first lens may have positive refractive power; the second lens may have the positive refractive power; the third lens has negative refractive power; the fourth lens has the positive refractive power; the fifth lens has the positive refractive power or the negative refractive power; the sixth lens has the positive refractive power or the negative refractive power; the seventh lens may have the positive refractive power or the negative refractive power; and the eighth lens may have the negative refractive power. The reasonable distribution of the refractive power of an optical system and the avoidance of over centralization of the refractive power are beneficial to balancing the aberration of the optical system and improving the imaging quality. The reasonable distribution of the positive and negative refractive power of the second lens and the third lens may effective balance the low order aberration of the system so that the system has better imaging quality and processing ability.

In an exemplary implementation mode, an object-side surface of the first lens may be a convex surface, and an image-side surface may be a concave surface.

In an exemplary implementation mode, an object-side surface of the second lens may be a convex surface, and an image-side surface may be a concave surface.

In an exemplary implementation mode, an object-side surface of the third lens may be a convex surface, and an image-side surface may be a concave surface.

In an exemplary implementation mode, an object-side surface and an image-side surface of the fourth lens may both be a convex surface.

In an exemplary implementation mode, an object-side surface of the fifth lens may be a concave surface.

In an exemplary implementation mode, an object-side surface of the sixth lens may be a concave surface.

In an exemplary implementation mode, an object-side surface of the seventh lens may be a convex surface, and an image-side surface may be a concave surface.

In an exemplary implementation mode, an object-side surface of the eighth lens may be a convex surface, and an image-side surface may be a concave surface.

In an exemplary implementation mode, a distance TTL on an optical axis from an object-side surface of the first lens to the imaging surface of the optical imaging lens, ImgH is a half of diagonal length of an effective pixel region on the imaging surface of the optical imaging lens, ImgH and an EPD of the optical imaging lens meet TTL/(EPD×ImgH) <0.5 mm$^{-1}$, for example, 0.40 mm$^{-1}$≤TTL/(EPD×ImgH) <0.5 mm$^{-1}$. Reasonably setting the interrelationship among the above three factors to meet the above condition is not only conducive to enhancing a light collecting ability of the optical system, enhancing image brightness, and improving the imaging quality of the optical system in a long shot state and in a close shot state, but also conducive to realizing miniaturization and large imaging surface state of the optical imaging lens.

In an exemplary implementation mode, the total effective focal length f of the optical imaging lens, the curvature radius R8 of the image-side surface of the fourth lens and the curvature radius R9 of the object-side surface of the fifth lens meet −2.0<f/R8+f/R9<0. Reasonably setting the interrelationship among the total effective focal length of the optical imaging lens, the curvature radius of the image-side surface of the fourth lens and the curvature radius of the object-side surface of the fifth lens to make them meet the above condition is conducive to reducing a deflection angle of light in the optical system and reducing the sensitivity of the lens.

In an embodiment, a curvature radius R7 of an object-side surface of the fourth lens and the curvature radius R8 of the image-side surface of the fourth lens meet −1.0<R7/R8<0. Setting the ratio of the curvature radius of the object-side surface of the fourth lens to the curvature radius of the image-side surface of the fourth lens within a reasonable range of values is conducive to reducing the deflection of lower light in the optical system, reducing the overall sensitivity of the system, and thus improving the imaging quality.

In an exemplary implementation mode, an effective focal length f4 of the fourth lens and an effective focal length f3 of the third lens meet f4/f3<−1.5, for example, −6.0<f4/f3<−1.5. Reasonably setting the ratio relationship between the effective focal length of the fourth lens and the effective focal length of the third lens is conducive to enhancing the light collecting ability of the optical system, enhancing the image brightness, and improving the imaging quality of the optical system in the long shot state.

In an exemplary implementation mode, a effective focal length f7 of the seventh lens and a effective focal length f8 of the eighth lens meet −1.5<f7/f8<0. Reasonably setting the ratio relationship between the effective focal length of the seventh lens and the effective focal length of the eighth lens is conducive to improving the imaging quality of the optical system in the close shot state, so that the optical system can give both close shot imaging and long shot imaging, and obtain better imaging quality.

In an exemplary implementation mode, the total effective focal length f of the optical imaging lens, a curvature radius R2 of an image-side surface of the first lens, and a curvature radius R1 of an object-side surface of the first lens meet f/(R2−R1)≥5.0. Reasonably setting the ratio relationship between the total effective focal length of the optical imaging lens and the difference between the curvature radius of the image-side surface of the first lens and the curvature radius of the object-side surface of the first lens is conducive to abating a ghostly image formed by reflection of light between the first lens and the second lens, and increasing a clear aperture of the optical system and improving a long-range imaging capability of the optical system, thus improving spherical aberration and reducing field sensitivity of the center region.

In an exemplary implementation mode, the total effective focal length f of the optical imaging lens and a curvature radius R4 of an image-side surface of the second lens meet 0<f/R4<0.5, for example, 0<f/R4<0.3. Reasonably setting the ratio relationship between the total effective focal length of the optical imaging lens and the curvature radius of the image-side surface of the second lens is not only conducive to increasing the clear aperture of the optical system and improving the imaging quality of the optical imaging lens in the long shot state, but also conductive to controlling the ghostly image formed in the second lens.

In an exemplary implementation mode, a curvature radius R4 of an image-side surface of the second lens and a curvature radius R5 of an object-side surface of the third lens meet 0<(R4−R5)/(R4+R5)≤1.0. Reasonably setting the interrelationship between the curvature radius of the image-side surface of the second lens and the curvature radius of the object-side surface of the third lens is conducive to enhancing the light collecting ability of the optical system, enhancing the image brightness, and improving the imaging quality of the optical system in the long shot state.

In an exemplary implementation mode, a curvature radius R6 of an image-side surface of the third lens and a curvature radius R7 of an object-side surface of the fourth lens meet −2.0<(R6+R7)/(R6−R7)<−1.0. Reasonably setting the interrelationship between the curvature radius of the image-side surface of the third lens and the curvature radius of the object-side surface of the fourth lens is conducive to reducing the deflection of the lower light, reducing the overall sensitivity of the system, and improving the imaging quality of the optical system. Especially in a system with large aperture, the above effect is more apparent when an incident angle and an exit angle of the light at the lower part of a diaphragm are too large.

In an exemplary implementation mode, the total effective focal length f of the optical imaging lens and a center thickness CT1 of the first lens on the optical axis meet 6.0≤f/CT1<10. Reasonably setting the ratio relationship between the total effective focal length of the optical imaging lens and the center thickness of the first lens on the optical axis is conductive to enhancing the light collecting ability of the optical system and improving the imaging quality of the optical system in a dark environment and in the long shot state.

In an exemplary implementation mode, an effective focal length f2 of the second lens and a center thickness CT2 of the second lens on the optical axis meet 6<f2/CT2<15. Reasonably setting the ratio relationship between the effective focal length of the second lens and the center thickness of the second lens on the optical axis is not only conductive to abating the ghostly image formed by the reflection of light in the lens, but also conductive to the processing and manufacturing of the second lens.

In an exemplary implementation mode, the total effective focal length f of the optical imaging lens, an effective focal length f5 of the fifth lens, and an effective focal length f6 of the sixth lens meet 0.5≤f/|f5|+f/|f6|<1.0. Reasonably setting the interrelationship among the total effective focal length of the optical imaging lens, the effective focal length of the fifth lens and the effective focal length of the sixth lens is conductive to eliminating the chromatic aberration of the optical system, reducing the secondary spectrum of the optical system, and improving the imaging quality of the system.

In an exemplary implementation mode, a distance T34 between the third lens and the fourth lens on the optical axis and a center thickness CT4 of the fourth lens on the optical axis meet 1≤T34/CT4<2. Reasonably setting the ratio relationship between the distance T34, between the third lens and the fourth lens on the optical axis, and the center thickness CT4 of the fourth lens on the optical axis is conductive to ensuring shaping characteristics of the lens, reducing the deflection of light in the optical system and reducing the sensitivity of the system.

In an exemplary implementation mode, a center thickness CT5 of the fifth lens on the optical axis and a distance T45 between the fourth lens and the fifth lens on the optical axis meet 1≤CT5/T45<5. Reasonably setting the ratio relationship between the center thickness CT5 of the fifth lens on the optical axis and the distance T45 between the fourth lens and the fifth lens on the optical axis is conductive to avoiding the surface reflection of light between two lenses.

In an exemplary implementation mode, a center thickness CT6 of the sixth lens on the optical axis, a center thickness CT7 of the seventh lens on the optical axis and a center thickness CT8 of the eighth lens on the optical axis meet 0.45 mm<(CT6+CT7+CT8)/3<0.6 mm. Reasonably setting the average center thickness of the above three lenses is not only conductive to ensuring the compactness between lens structures, but also conductive to the processing and forming of each lens.

In an exemplary implementation mode, an abbe number V6 of the sixth lens and an abbe number V7 of the seventh lens meet 0.5≤V6/V7<2.0. Reasonably setting the ratio relationship between the abbe number of the sixth lens and the abbe number of the seventh lens is conductive to converging the overall aberration of the optical system and improving the imaging quality.

In an exemplary implementation mode, an abbe number V4 of the fourth lens, an abbe number V5 of the fifth lens and an abbe number V6 of the sixth lens meet 1≤|V4−V5|/V6<1.5. Reasonably setting the interrelationship among the abbe numbers of the above three lenses is conductive to eliminating the chromatic aberration of the system, reducing the aberration corresponding to the light in different wavebands of the system, and improving the imaging quality.

In an exemplary implementation mode, the optical imaging lens may further include a diaphragm. The diaphragm may be set in place as needed. For example, the diaphragm may be arranged between the object side and the first lens. Optionally, the optical imaging lens may further include an optical filter configured to correct the chromatic aberration and/or protective glass configured to protect a photosensitive element on the imaging surface.

The optical imaging lens according to the above implementation modes of the disclosure may use multiple lenses, for example, eight lenses. The optical imaging lens of the disclosure may meet the requirements of large aperture, large imaging surface, high pixel and portability, may have excellent imaging quality in both long and close shots, and may obtain satisfactory imaging results in different environments.

In an exemplary implementation mode, at least one of mirror surfaces of each lens is an aspherical mirror surface, that is, at least one from the object-side surface of the first lens to the image-side surface of the eighth lens is the aspherical mirror surface. The aspherical mirror surface has the characteristic that the curvature keeps changing from a center of the lens to a periphery of the lens. Unlike a spherical lens with a constant curvature from the center of the lens to the periphery of the lens, an aspherical lens has a better curvature radius characteristic and the advantages of improving distortion aberrations and improving astigmatic aberrations. With adoption of the aspherical lens, the aberrations during imaging may be eliminated as much as possible, thereby improving the imaging quality. Optionally, at least one of the object-side surface and the image-side surface of each of the first lens, the second lens, the third lens, the fourth lens, the fifth lens, the sixth lens, the seventh lens and the eighth lens is the aspherical mirror surface. Optionally, both the object-side surface and the image-side surface of each of the first lens, the second lens, the third lens, the fourth lens, the fifth lens, the sixth lens, the seventh lens and the eighth lens are the aspherical mirror surface.

The disclosure also provides an imaging device, an electronic photosensitive element of the imaging device may be a Charge Coupled Device (CCD) or a Complementary Metal Oxide Semiconductor (CMOS). The imaging device may be an independent imaging device like a digital camera or an imaging module integrated into a mobile electronic device like a mobile phone. The imaging device is equipped with the optical imaging lens described above.

An exemplary implementation mode of the disclosure also provides an electronic device, which includes the imaging device described above.

However, those skilled in the art should know that the number of the lenses forming the optical imaging lens may be changed without departing from the technical solutions claimed in the disclosure to achieve each result and advantage described in the specification. For example, although descriptions are made in the implementation with eight lenses as an example, the optical imaging lens is not limited to eight lenses. If necessary, the optical imaging lens may further include another number of lenses.

Specific embodiments of the optical imaging lens applied to the abovementioned implementation mode will further be described below with reference to the drawings.

Embodiment 1

Figure 2A:
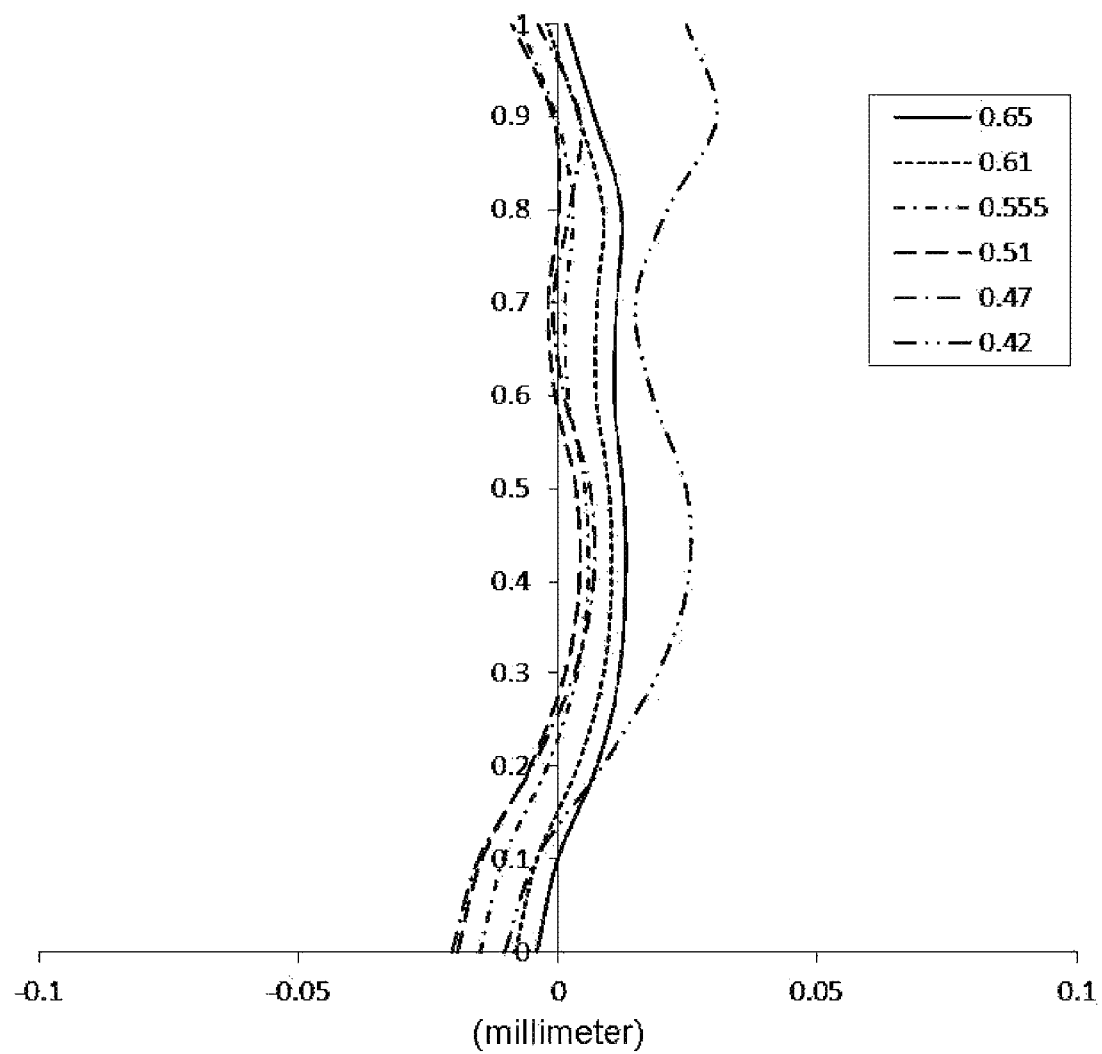
FIG. 2A to FIG. 2D illustrate a longitudinal aberration curve, astigmatism curve, distortion curve and lateral color curve of an optical imaging lens according to embodiment 1 respectively.
Figure 2B:
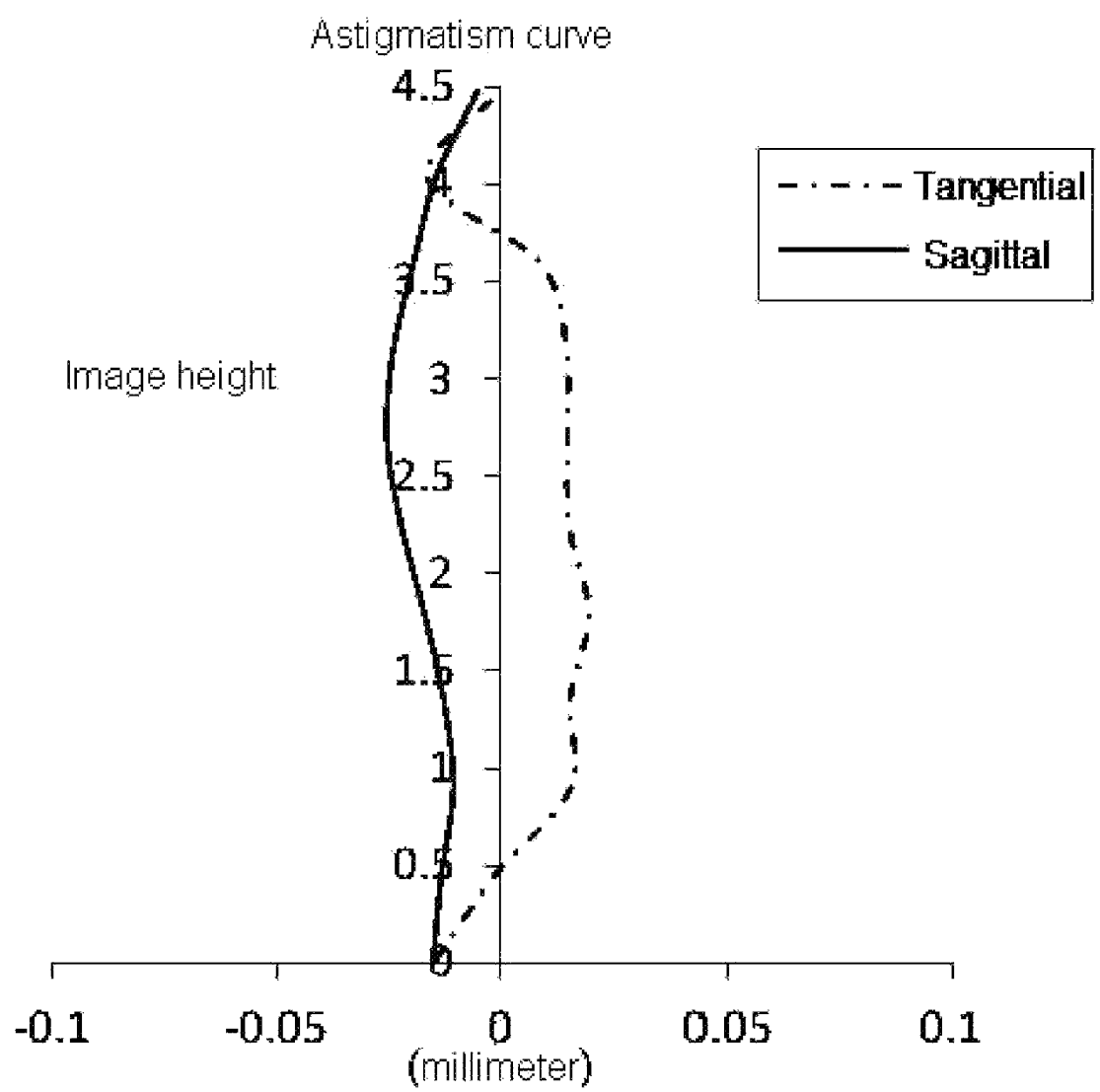
Figure 2C:
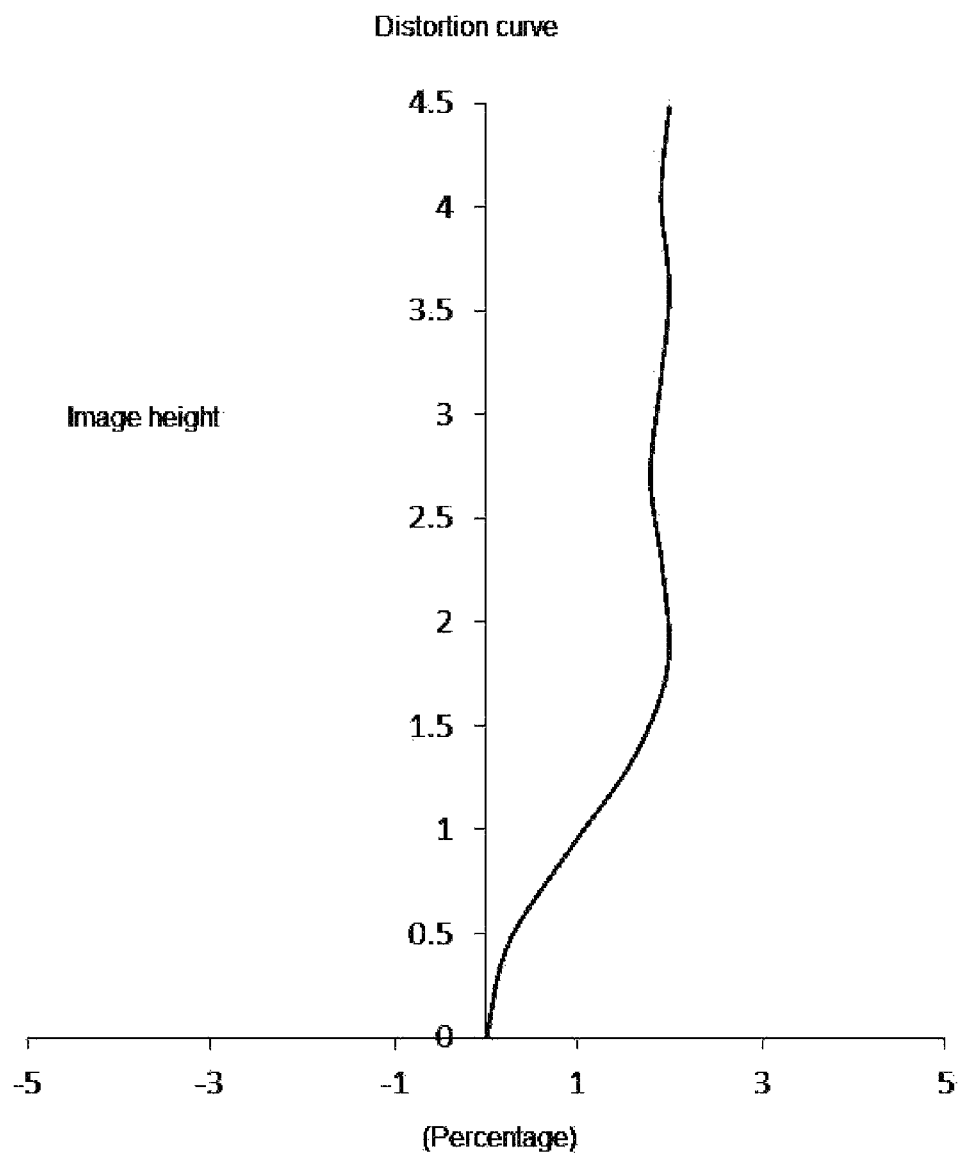
Figure 2D:
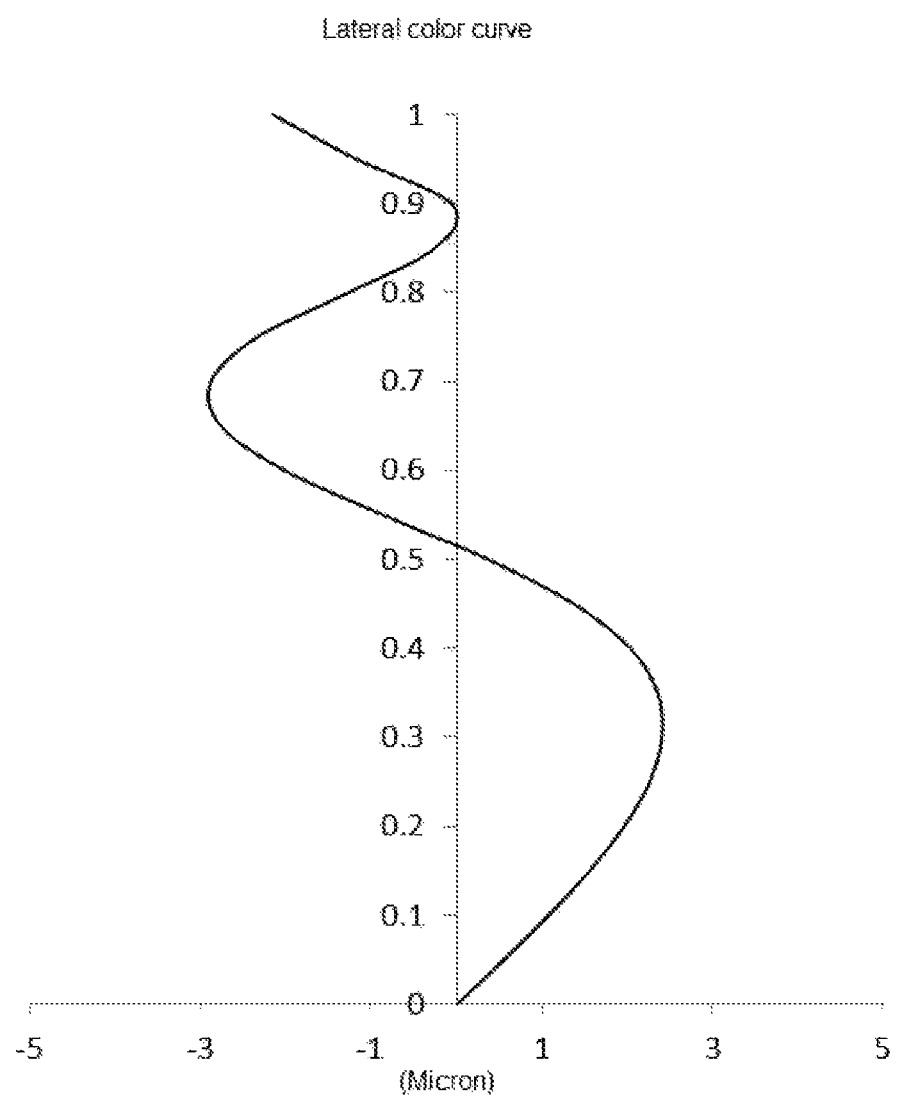

An optical imaging lens according to embodiment 1 of the disclosure will be described below with reference to FIG. 1 to FIG. 2D, FIG. 1 is a structure diagram of an optical imaging lens according to embodiment 1 of the disclosure.

As shown in FIG. 1, the optical imaging lens sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth element E9 and an imaging surface S19.

The first lens E1 has the positive refractive power, the object-side surface S1 thereof is a convex surface, and the image-side surface S2 is a concave surface. The second lens E2 has the positive refractive power, the object-side surface S3 thereof is a convex surface, and the image-side surface S4 is a concave surface. The third lens E3 has the negative refractive power, the object-side surface S5 thereof is a convex surface, and the image-side surface S6 is a concave surface. The fourth lens E4 has the positive refractive power, the object-side surface S7 thereof is a convex surface, and the image-side surface S8 is a convex surface. The fifth lens E5 has the negative refractive power, the object-side surface S9 thereof is a concave surface, and the image-side surface S10 is a concave surface. The sixth lens E6 has the negative refractive power, the object-side surface S11 thereof is a concave surface, and the image-side surface S12 is a convex surface. The seventh lens E7 has the positive refractive power, the object-side surface S13 thereof is a convex surface, and the image-side surface S14 is a concave surface. The eighth lens E8 has the negative refractive power, the object-side surface S15 thereof is a convex surface, and the image-side surface S16 is a concave surface. The optical filter E9 has an object-side surface S17 and an image-side surface S18. Light from an object sequentially penetrates through each of the surfaces S1 to S18 and is finally imaged on the imaging surface S19.

Table 1 shows basic parameters of the optical imaging lens of embodiment 1, in which the units of curvature radius, thickness/distance and focal length are millimeter (mm).

TABLE 1

| Surface number | Surface type | Curvature radius | Thickness/ distance | Refractive index | Abbe number | Focal length | Cone coefficient |
|---|---|---|---|---|---|---|---|
| OBJ | Spherical | Infinite | Infinite | | | | |
| STO | Spherical | Infinite | −0.5432 | | | | |
| S1 | Aspherical | 2.7557 | 0.7116 | 1.546 | 56.11 | 34.82 | 0.0000 |
| S2 | Aspherical | 2.9290 | 0.1885 | | | | −5.5539 |
| S3 | Aspherical | 2.9328 | 0.7113 | 1.546 | 56.11 | 5.47 | −10.3775 |
| S4 | Aspherical | 143.6125 | 0.0314 | | | | −99.0000 |
| S5 | Aspherical | 5.1443 | 0.3200 | 1.678 | 19.25 | −10.46 | −12.9855 |
| S6 | Aspherical | 2.9059 | 0.5107 | | | | 1.3895 |
| S7 | Aspherical | 20.1332 | 0.4388 | 1.546 | 56.11 | 21.73 | 99.0000 |
| S8 | Aspherical | −28.6431 | 0.1402 | | | | 73.9417 |
| S9 | Aspherical | −20.7595 | 0.3000 | 1.678 | 19.25 | −20.64 | 99.0000 |
| S10 | Aspherical | 43.1035 | 0.2074 | | | | −99.0000 |
| S11 | Aspherical | −4.8692 | 0.4999 | 1.598 | 29.89 | −10.96 | −82.1819 |
| S12 | Aspherical | −19.3164 | 0.0300 | | | | 41.9136 |
| S13 | Aspherical | 1.7762 | 0.6070 | 1.587 | 32.92 | 5.20 | −8.0705 |
| S14 | Aspherical | 3.6816 | 0.6981 | | | | −28.3087 |
| S15 | Aspherical | 2.0769 | 0.5021 | 1.536 | 55.74 | −13.62 | −6.0107 |
| S16 | Aspherical | 1.4809 | 0.8622 | | | | −3.9996 |
| S17 | Spherical | Infinite | 0.2100 | 1.517 | 64.17 | | |
| S18 | Spherical | Infinite | 0.3309 | | | | |
| S19 | Spherical | Infinite | | | | | |

In the present embodiment, ImgH is a half of diagonal length of an effective pixel region on the imaging surface of the imaging surface S19, the total effective focal length of the optical imaging lens is equal to 5.51 mm, and the ImgH is equal to 4.48 mm.

In embodiment 1, both the object-side surface and image-side surface of any lens in the first lens E1 to the eighth lens E8 are aspherical surfaces, and the surface type x of each aspherical lens may be defined by use of, but not limited to, the following aspherical surface formula:

$$x = \frac{ch^2}{1 + \sqrt{1 - (k+1)c^2h^2}} + \Sigma Aih^i \tag{1}$$

where x is a distance rise between a position of the aspherical surface at a height h in a direction of the optical axis and an aspherical surface vertex; c is a paraxial curvature of the aspherical surface, c=1/R (namely, the paraxial curvature c is a reciprocal of the curvature radius R in Table 1); k is a cone coefficient; and Ai is an i-thorder correction coefficient of the aspherical surface. Table 2 shows higher-order coefficients A4, A6, A8, A10, A12, A14, A16, A18 and A20 applicable to the aspherical mirror surfaces S1-S16 in embodiment 1.

TABLE 2

| Surface number | A4 | A6 | A8 | A10 | A12 | A14 | A16 | A18 | A20 |
|---|---|---|---|---|---|---|---|---|---|
| S1 | −7.8992E−03 | 6.8842E−04 | −2.0199E−03 | 1.5124E−03 | −8.0702E−04 | 2.5787E−04 | −5.2355E−05 | 5.0863E−06 | 1.2774E−07 |
| S2 | −5.5365E−03 | −1.1616E−02 | 3.3101E−03 | −5.4319E−04 | 6.9849E−05 | −1.1832E−06 | −3.2826E−07 | 0.0000E+00 | 0.0000E+00 |

TABLE 2-continued

| Surface number | A4 | A6 | A8 | A10 | A12 | A14 | A16 | A18 | A20 |
|---|---|---|---|---|---|---|---|---|---|
| S3 | 2.2929E−02 | −3.0771E−02 | 8.7348E−03 | −7.1816E−04 | 0.0000E+00 | 0.0000E+00 | 0.0000E+00 | 0.0000E+00 | 0.0000E+00 |
| S4 | −2.4174E−02 | 1.1040E−02 | −2.3909E−03 | −1.2457E−03 | 7.9310E−04 | −1.6191E−04 | 1.1943E−05 | 0.0000E+00 | 0.0000E+00 |
| S5 | −2.5172E−02 | 1.2793E−02 | 1.0289E−02 | −1.3362E−02 | 5.2214E−03 | −8.9188E−04 | 5.7719E−05 | 0.0000E+00 | 0.0000E+00 |
| S6 | −3.0104E−02 | 1.5108E−03 | 9.2813E−03 | −8.5737E−03 | 2.4102E−03 | −1.3136E−04 | −3.0765E−05 | 0.0000E+00 | 0.0000E+00 |
| S7 | −9.6024E−03 | 7.0183E−03 | −1.4851E−02 | 9.4090E−03 | −2.8317E−03 | 3.1628E−04 | 0.0000E+00 | 0.0000E+00 | 0.0000E+00 |
| S8 | 1.0131E−02 | 8.1996E−03 | −1.8198E−02 | 7.7049E−03 | −1.5148E−03 | 1.3224E−04 | 0.0000E+00 | 0.0000E+00 | 0.0000E+00 |
| S9 | −2.8576E−04 | −1.6163E−03 | −6.7933E−03 | 2.8539E−03 | −6.1004E−04 | 1.6640E−04 | −2.2781E−03 | 0.0000E+00 | 0.0000E+00 |
| S10 | 1.5394E−02 | −1.7886E−02 | 2.3820E−03 | 0.0000E+00 | 0.0000E+00 | 0.0000E+00 | 0.0000E+00 | 0.0000E+00 | 0.0000E+00 |
| S11 | 3.4370E−02 | −1.4063E−02 | 1.2100E−03 | 0.0000E+00 | 0.0000E+00 | 0.0000E+00 | 0.0000E+00 | 0.0000E+00 | 0.0000E+00 |
| S12 | −6.5274E−02 | 2.6673E−02 | −6.6092E−03 | 7.6587E−04 | 1.2933E−04 | −5.9900E−05 | 8.3487E−06 | −4.3386E−07 | 0.0000E+00 |
| S13 | 4.3736E−02 | −3.0676E−02 | 1.0893E−02 | −3.8720E−03 | 1.0202E−03 | −1.6167E−04 | 1.3561E−05 | −4.5991E−07 | 0.0000E+00 |
| S14 | 8.3579E−02 | −4.1591E−02 | 9.3789E−03 | −1.2568E−03 | 9.9150E−05 | −4.2317E−06 | 7.7910E−08 | −1.7428E−10 | 0.0000E+00 |
| S15 | −1.0008E−01 | 2.2200E−02 | −2.8601E−03 | 2.6883E−04 | −1.8893E−05 | 8.8833E−07 | −2.1948E−08 | 1.5328E−10 | 0.0000E+00 |
| S16 | −7.0642E−02 | 1.8140E−02 | −3.5883E−03 | 4.4266E−04 | −2.6801E−05 | 2.3449E−07 | 4.8863E−08 | −1.6229E−09 | 0.0000E+00 |

FIG. 2A illustrates a longitudinal aberration curve of the optical imaging lens according to embodiment 1 to represent deviation of a convergence focal point after light with different wavelengths passes through the lens. FIG. 2B illustrates an astigmatism curve of the optical imaging lens according to embodiment 1 to represent a tangential image surface curvature and a sagittal image surface curvature. FIG. 2C illustrates a distortion curve of the optical imaging lens according to embodiment 1 to represent distortion values corresponding to different image heights. FIG. 2D illustrates a lateral color curve of the optical imaging lens according to embodiment 1 to represent deviation of different image heights on the imaging surface after the light passes through the lens. According to FIG. 2A to FIG. 2D, it can be seen that the optical imaging lens provided in embodiment 1 may achieve high imaging quality.

Embodiment 2

Figure 3:
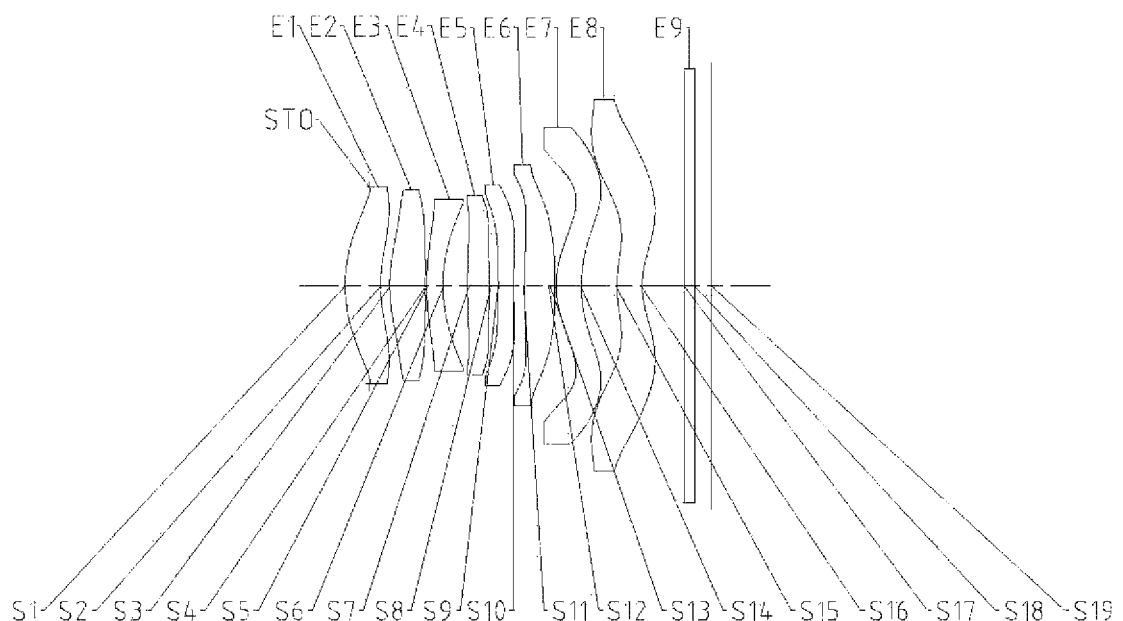
FIG. 3 is a structure diagram of an optical imaging, lens according to embodiment 2 of the disclosure.

The optical imaging lens according to embodiment 2 of the disclosure will be described below with reference to FIG. 3 to FIG. 4D. FIG. 3 is a structure diagram of the optical imaging lens according to embodiment 2 of the disclosure.

As shown in FIG. 3, the optical imaging lens sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth element E9 and the imaging surface S19.

The first lens E1 has the positive refractive power, the object-side surface S1 thereof is a convex surface, and the image-side surface S2 is a concave surface. The second lens E2 has the positive refractive power, the object-side surface S3 thereof is a convex surface, and the image-side surface S4 is a concave surface. The third lens E3 has the negative refractive power, the object-side surface S5 thereof is a convex surface, and the image-side surface S6 is a concave surface. The fourth lens E4 has the positive refractive power, the object-side surface S7 thereof is a convex surface, and the image-side surface S8 is a convex surface. The fifth lens E5 has the negative refractive power, the object-side surface S9 thereof is a concave surface, and the image-side surface S10 is a concave surface. The sixth lens E6 has the negative refractive power, the object-side surface S11 thereof is a concave surface, and the image-side surface S12 is a convex surface. The seventh lens E7 has the positive refractive power, the object-side surface S13 thereof is a convex surface, and the image-side surface S14 is a concave surface. The eighth lens E8 has the negative refractive power, the object-side surface S15 thereof is a convex surface, and the image-side surface S16 is a concave surface. The optical filter E9 has the object-side surface S17 and the image-side surface S18. Light from an object sequentially penetrates through each of the surfaces S1 to S18 and is finally imaged on the imaging surface S19.

In the present embodiment, ImgH is a half of diagonal length of an effective pixel region on the imaging surface of the imaging surface S19, the total effective focal length of the optical imaging lens is equal to 5.51 mm, and the ImgH is equal to 4.48 mm.

Table 3 shows basic parameters of the optical imaging lens of embodiment 2, in which the units of curvature radius, thickness/distance and focal length are millimeter (mm).

TABLE 3

| Surface number | Surface Type | Curvature radius | Thickness/ distance | Material Refractive index | Abbe number | Focal lengh | Cone coefficient |
|---|---|---|---|---|---|---|---|
| OBJ | Spherical | Infinite | Infinite | | | | |
| STO | Spherical | Infinite | −0.4742 | | | | |
| S1 | Aspherical | 2.8882 | 0.7087 | 1.546 | 56.11 | 29.07 | 0.0000 |
| S2 | Aspherical | 3.2247 | 0.1782 | | | | −6.5152 |
| S3 | Aspherical | 3.1279 | 0.7112 | 1.546 | 56.11 | 5.91 | −12.4365 |
| S4 | Aspherical | 95.8797 | 0.0300 | | | | 45.9413 |
| S5 | Aspherical | 4.7496 | 0.3200 | 1.678 | 19.25 | −10.75 | −21.5451 |
| S6 | Aspherical | 2.7962 | 0.4901 | | | | 1.0017 |
| S7 | Aspherical | 16.1776 | 0.4266 | 1.546 | 56.11 | 19.14 | 16.7741 |
| S8 | Aspherical | −29.2476 | 0.1906 | | | | 99.0000 |
| S9 | Aspherical | −19.5769 | 0.3000 | 1.678 | 19.25 | −11.40 | 99.0000 |
| S10 | Aspherical | 12.8367 | 0.2345 | | | | −91.2909 |

TABLE 3-continued

| Surface number | Surface Type | Curvature radius | Thickness/ distance | Material Refractive index | Abbe number | Focal length | Cone coefficient |
|---|---|---|---|---|---|---|---|
| S11 | Aspherical | −40.6925 | 0.5859 | 1.587 | 32.78 | −98.90 | 84.5290 |
| S12 | Aspherical | −134.9604 | 0.0300 | | | | 99.0000 |
| S13 | Aspherical | 1.9378 | 0.5052 | 1.613 | 26.86 | 6.35 | −6.3985 |
| S14 | Aspherical | 3.4543 | 0.7023 | | | | −23.3099 |
| S15 | Aspherical | 2.1800 | 0.5004 | 1.536 | 55.74 | −11.34 | −8.8023 |
| S16 | Aspherical | 1.4765 | 0.8452 | | | | −4.1559 |
| S17 | Spherical | Infinite | 0.2100 | 1.517 | 64.17 | | |
| S18 | Spherical | Infinite | 0.3309 | | | | |
| S19 | Spherical | Infinite | | | | | |

In embodiment 2, both the object-side surface and the image-side surface of any lens in the first lens E1 to the eighth lens E8 are aspheric surfaces, Table 4 shows the higher-order coefficients A4, A6, A8, A10, A12, A14, A16, A18 and A20 applicable to the aspherical mirror surfaces S1-S16 in embodiment 2.

TABLE 4

| Surface number | A4 | A6 | A8 | A10 | A12 | A14 | A16 | A18 | A20 |
|---|---|---|---|---|---|---|---|---|---|
| S1 | −8.4849E−03 | 3.9328E−04 | −1.8570E−03 | 1.0442E−03 | −3.5774E−04 | 2.8641E−05 | 1.0210E−05 | −2.6537E−06 | 3.2571E−07 |
| S2 | −1.0683E−02 | −1.1369E−02 | 2.5882E−03 | 5.6601E−04 | −3.7325E−04 | 7.5346E−05 | −5.6501E−06 | 0.0000E+00 | 0.0000E+00 |
| S3 | 2.3016E−02 | −3.2162E−02 | 1.0608E−02 | −1.0814E−03 | 0.0000E+00 | 0.0000E+00 | 0.0000E+00 | 0.0000E+00 | 0.0000E+00 |
| S4 | −1.7541E−02 | 7.9735E−03 | −3.3288E−03 | −2.5421E−05 | 3.6805E−04 | −9.3982E−05 | 7.3172E−06 | 0.0000E+00 | 0.0000E+00 |
| S5 | −1.2119E−02 | 1.4118E−03 | 1.4008E−02 | −1.4710E−02 | 6.0363E−03 | −1.1411E−03 | 8.4412E−05 | 0.0000E+00 | 0.0000E+00 |
| S6 | −3.3108E−02 | 7.8298E−04 | 1.0530E−02 | −1.0228E−02 | 3.7856E−03 | −5.9752E−04 | 2.7226E−05 | 0.0000E+00 | 0.0000E+00 |
| S7 | 4.2797E−03 | −6.3550E−03 | −2.6925E−03 | 2.7149E−03 | −8.6625E−04 | 7.8137E−05 | 0.0000E+00 | 0.0000E+00 | 0.0000E+00 |
| S8 | 3.1018E−02 | −1.8299E−02 | 1.5598E−03 | 5.5617E−04 | −2.4917E−04 | 3.6979E−05 | 0.0000E+00 | 0.0000E+00 | 0.0000E+00 |
| S9 | 5.1631E−05 | −1.6006E−02 | 8.1796E−03 | −2.5793E−03 | 1.2689E−04 | 1.6002E−04 | −2.6133E−05 | 0.0000E+00 | 0.0000E+00 |
| S10 | −1.2610E−02 | −9.3721E−03 | 1.6251E−03 | 0.0000E+00 | 0.0000E+00 | 0.0000E+00 | 0.0000E+00 | 0.0000E+00 | 0.0000E+00 |
| S11 | 3.5784E−02 | −1.5142E−02 | 1.3311E−03 | 0.0000E+00 | 0.0000E+00 | 0.0000E+00 | 0.0000E+00 | 0.0000E+00 | 0.0000E+00 |
| S12 | −7.4209E−02 | 3.8538E−02 | −1.3019E−02 | 2.5077E−03 | −2.8494E−04 | 2.4224E−05 | −1.4928E−06 | 2.7875E−08 | 0.0000E+00 |
| S13 | 3.9164E−02 | −2.4736E−02 | 5.0620E−03 | −1.5756E−03 | 5.2536E−04 | −1.0164E−04 | 9.8659E−06 | −3.7454E−07 | 0.0000E+00 |
| S14 | 1.0101E−01 | −5.6668E−02 | 1.4218E−02 | −2.1160E−03 | 1.8296E−04 | −7.5321E−06 | 1.7762E−08 | 5.8343E−09 | 0.0000E+00 |
| S15 | −9.2323E−02 | 1.2998E−02 | 9.6255E−04 | −4.9448E−04 | 6.7440E−05 | −4.8294E−06 | 1.8570E−07 | −3.0467E−09 | 0.0000E+00 |
| S16 | −7.6257E−02 | 2.1624E−02 | −5.1179E−03 | 8.6717E−04 | −9.2045E−05 | 5.6911E−06 | −1.8495E−07 | 2.4043E−09 | 0.0000E+00 |

Figure 4A:
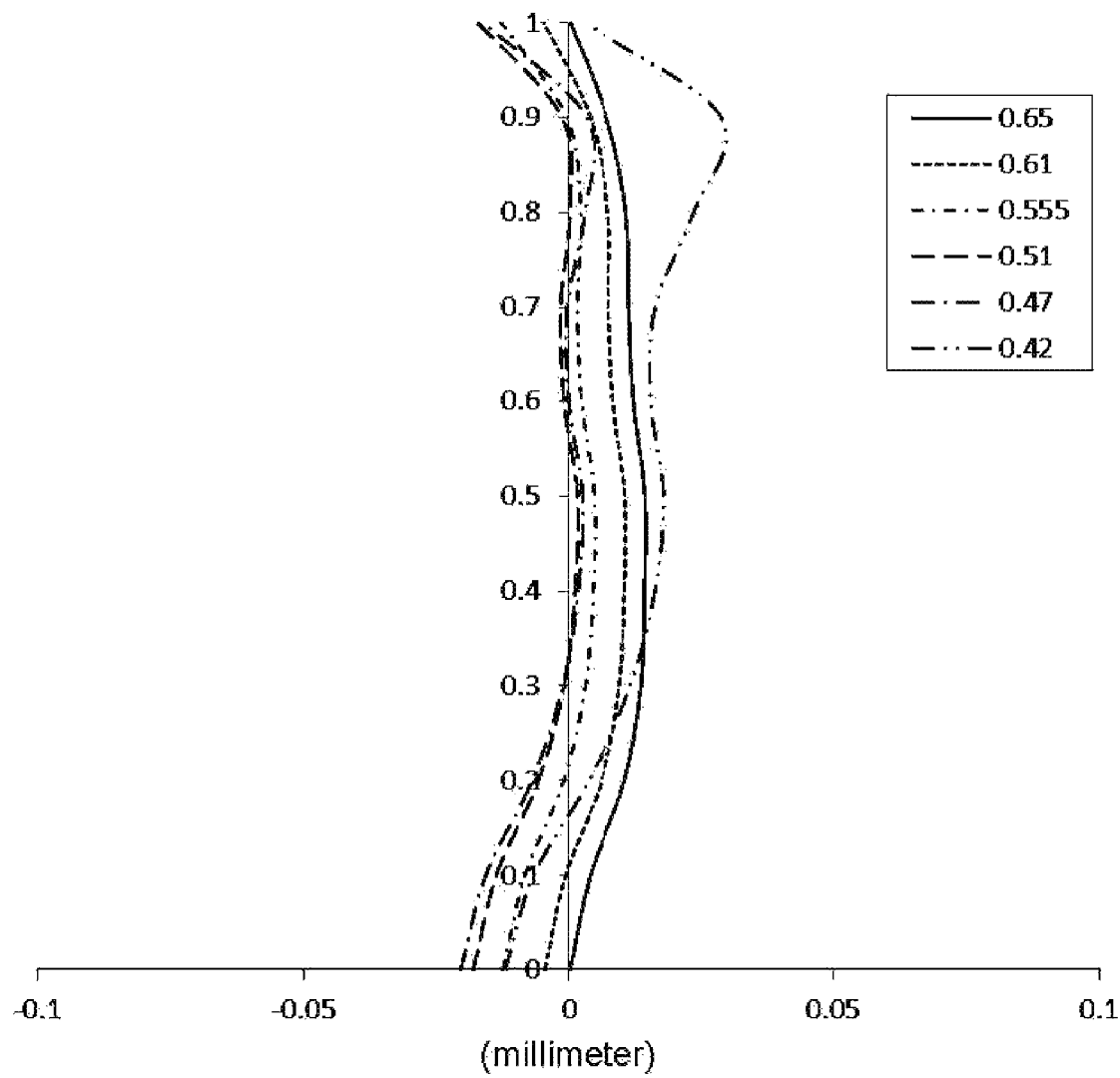
FIG. 4A to FIG. 4D illustrate a longitudinal aberration curve, astigmatism curve, distortion curve and lateral color aberration curve of an optical imaging lens according to embodiment 2 respectively.
Figure 4B:
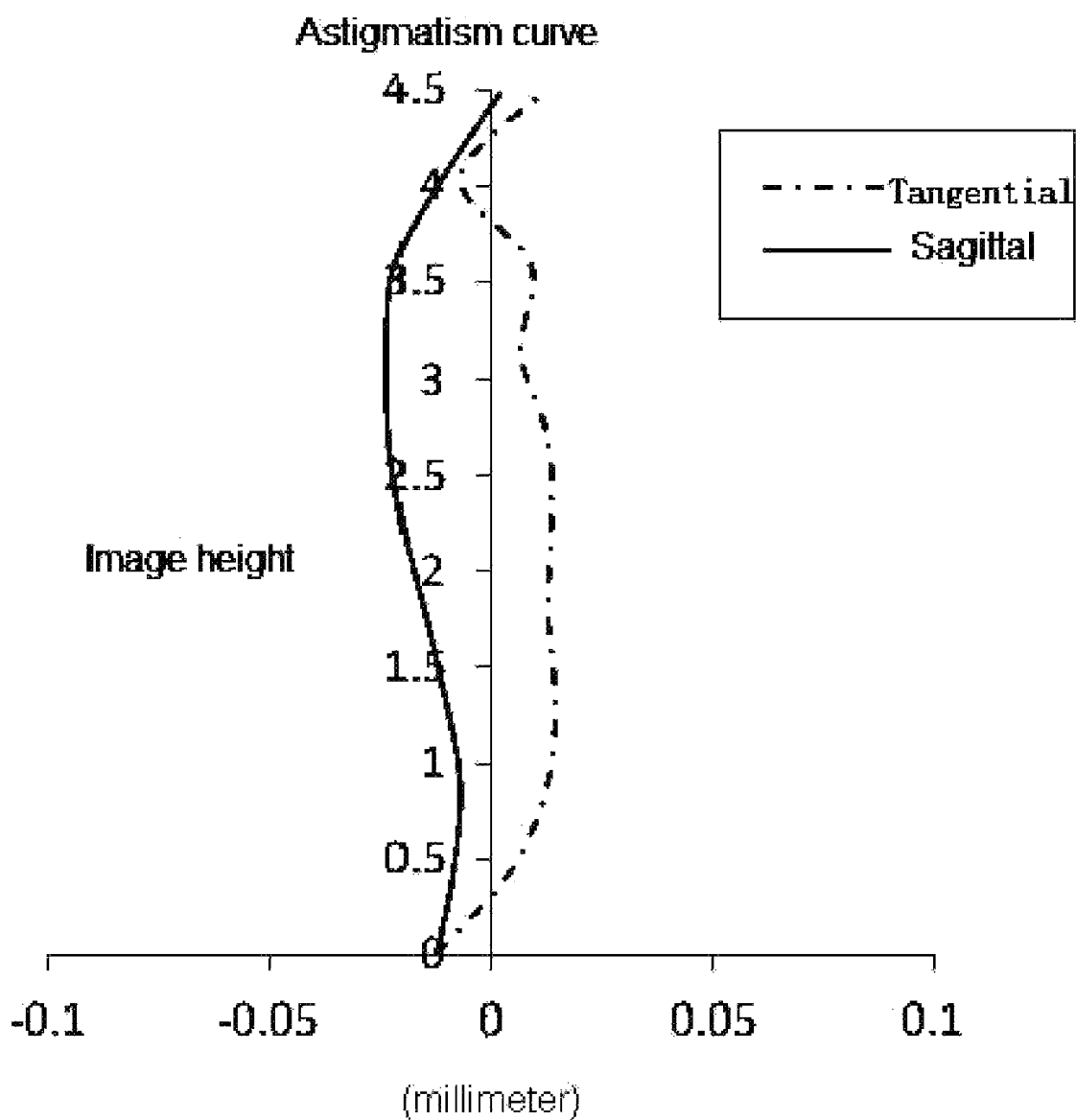
Figure 4C:
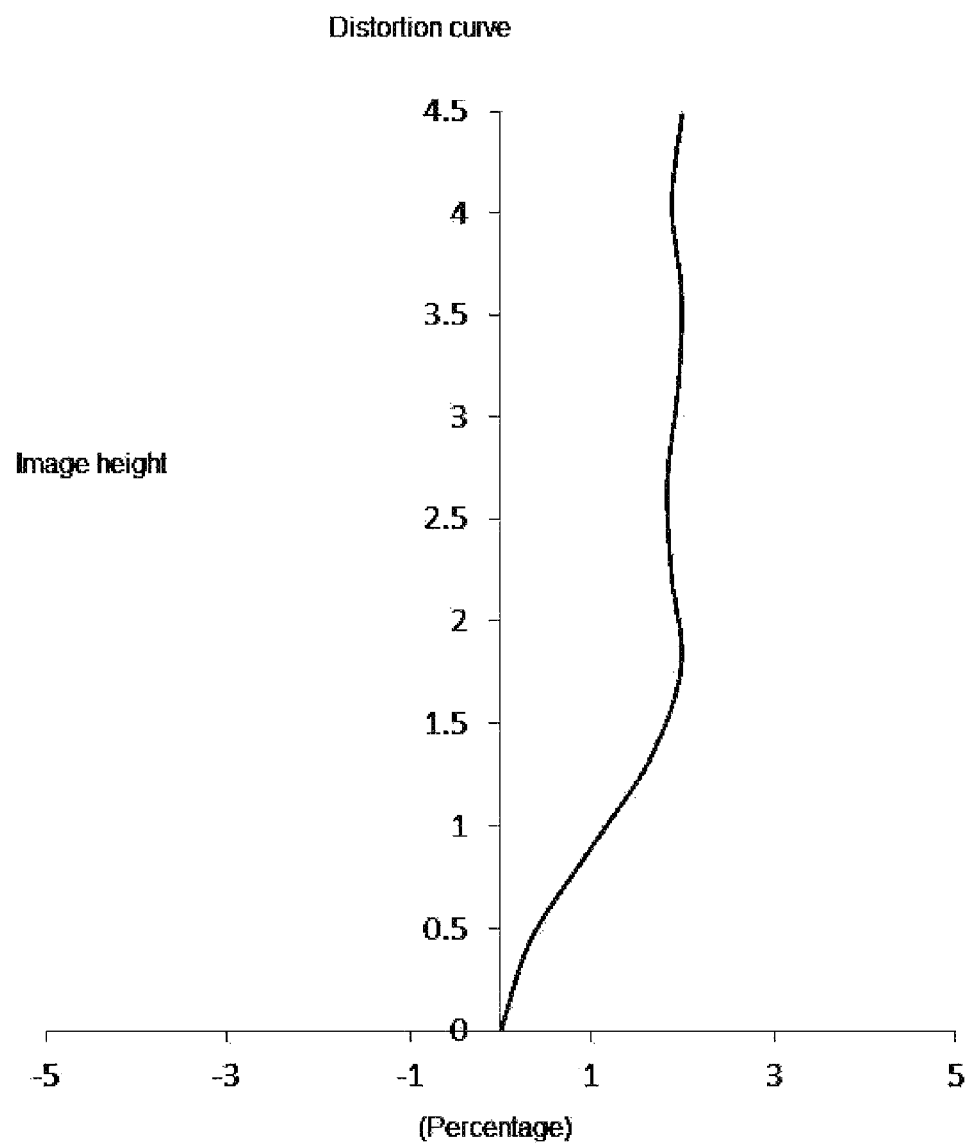
Figure 4D:
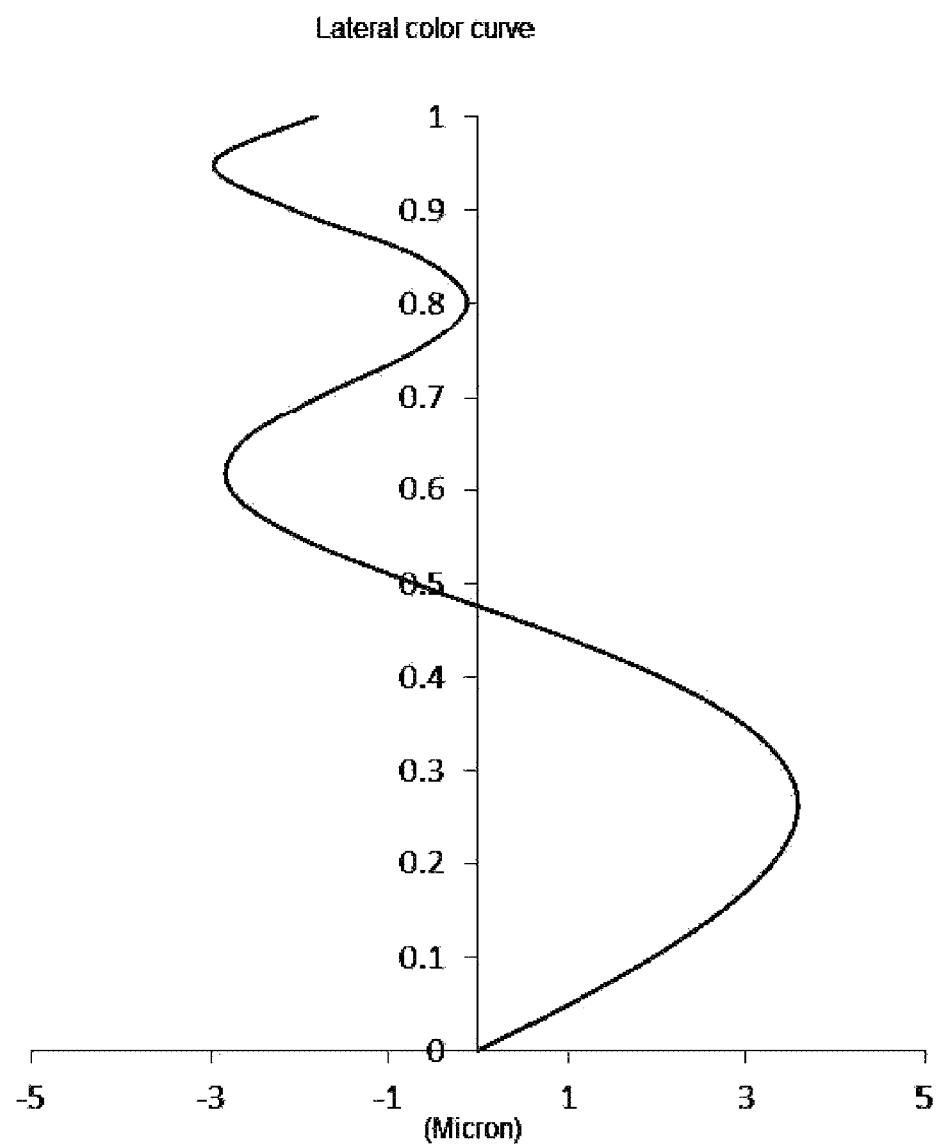

FIG. 4A illustrates a longitudinal aberration curve of the optical imaging lens according to embodiment 2 to represent deviation of the convergence focal point after light with different wavelengths passes through the lens. FIG. 4B illustrates the astigmatism curve of the optical imaging lens according to embodiment 2 to represent the tangential image surface curvature and the sagittal image surface curvature. FIG. 4C illustrates the distortion curve of the optical imaging lens according to embodiment 2 to represent the distortion values corresponding to different image heights. FIG. 4D illustrates the lateral color curve of the optical imaging lens according to embodiment 2 to represent the deviation of different image heights on the imaging surface after the light passes through the lens. According to FIG. 4A to FIG. 4D, it can be seen that the optical imaging lens provided in embodiment 2 may achieve high imaging quality.

Embodiment 3

Figure 5:
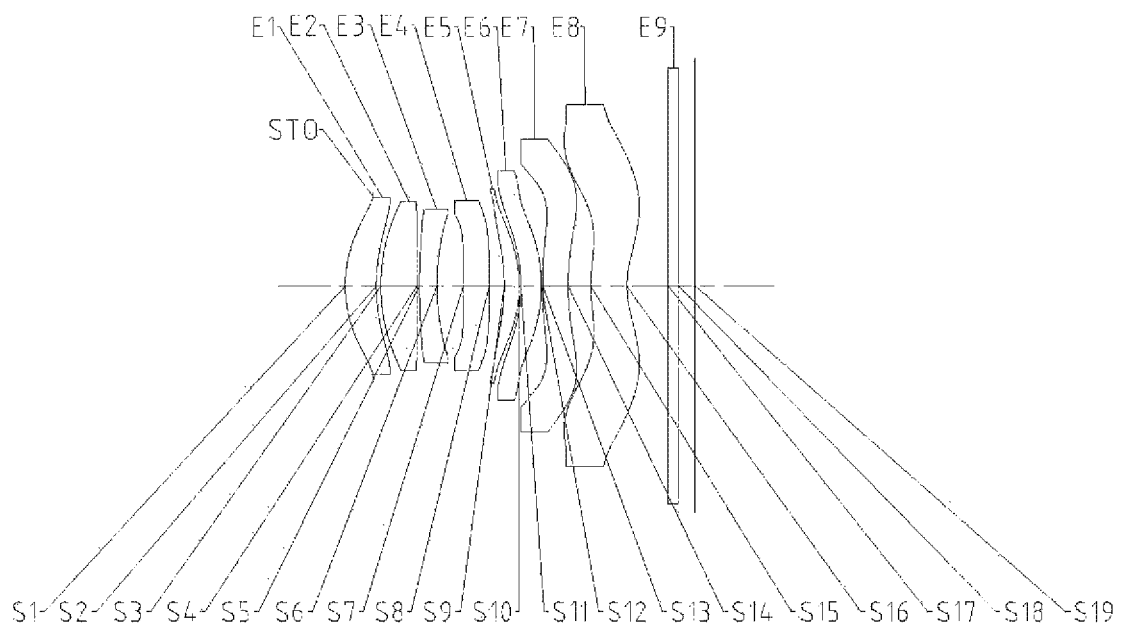
FIG. 5 is a structure diagram of an optical imaging lens according to embodiment 3 of the disclosure.

The optical imaging lens according to embodiment 3 of the disclosure will be described below with reference to FIG. 5 to FIG. 6D. FIG. 5 is a structure diagram of the optical imaging lens according to embodiment 3 of the disclosure;

As shown in FIG. 5, the optical imaging lens sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth element E9 and an imaging surface S19.

The first lens E1 has the positive refractive power, the object-side surface S1 thereof is a convex surface, and the image-side surface S2 is a concave surface. The second lens E2 has the positive refractive power, the object-side surface S3 thereof is a convex surface, and the image-side surface S4 is a concave surface. The third lens E3 has the negative refractive power, the object-side surface S5 thereof is a convex surface, and the image-side surface S6 is a concave surface. The fourth lens E4 has the positive refractive power, the object-side surface S7 thereof is a convex surface, and the image-side surface S8 is a convex surface. The fifth lens E5 has the positive refractive power, the object-side surface S9 thereof is a concave surface, and the image-side surface S10 is a convex surface. The sixth lens E6 has the positive refractive power, the object-side surface S11 thereof is a concave surface, and the image-side surface S12 is a convex surface. The seventh lens E7 has the negative refractive power, the object-side surface S13 thereof is a convex surface, and the image-side surface S14 is a concave surface. The eighth lens E8 has the negative refractive power, the object-side surface S15 thereof is a convex surface, and the image-side surface S16 is a concave surface. The optical filter E9 has the object-side surface S17 and the image-side surface S18. Light from an object sequentially penetrates through each of the surfaces S1 to S18 and is finally imaged on the imaging surface S19.

In the present embodiment, ImgH is a half of diagonal length of an effective pixel region on the imaging surface of the imaging surface S19, the total effective focal length of the optical imaging lens is equal to 5.57 mm, and the ImgH is equal to 4.53 mm.

Table 5 shows basic parameters of the optical imaging lens of embodiment 3, in which the units of curvature radius, thickness/distance and focal length are millimeter (mm).

Figure 6A:
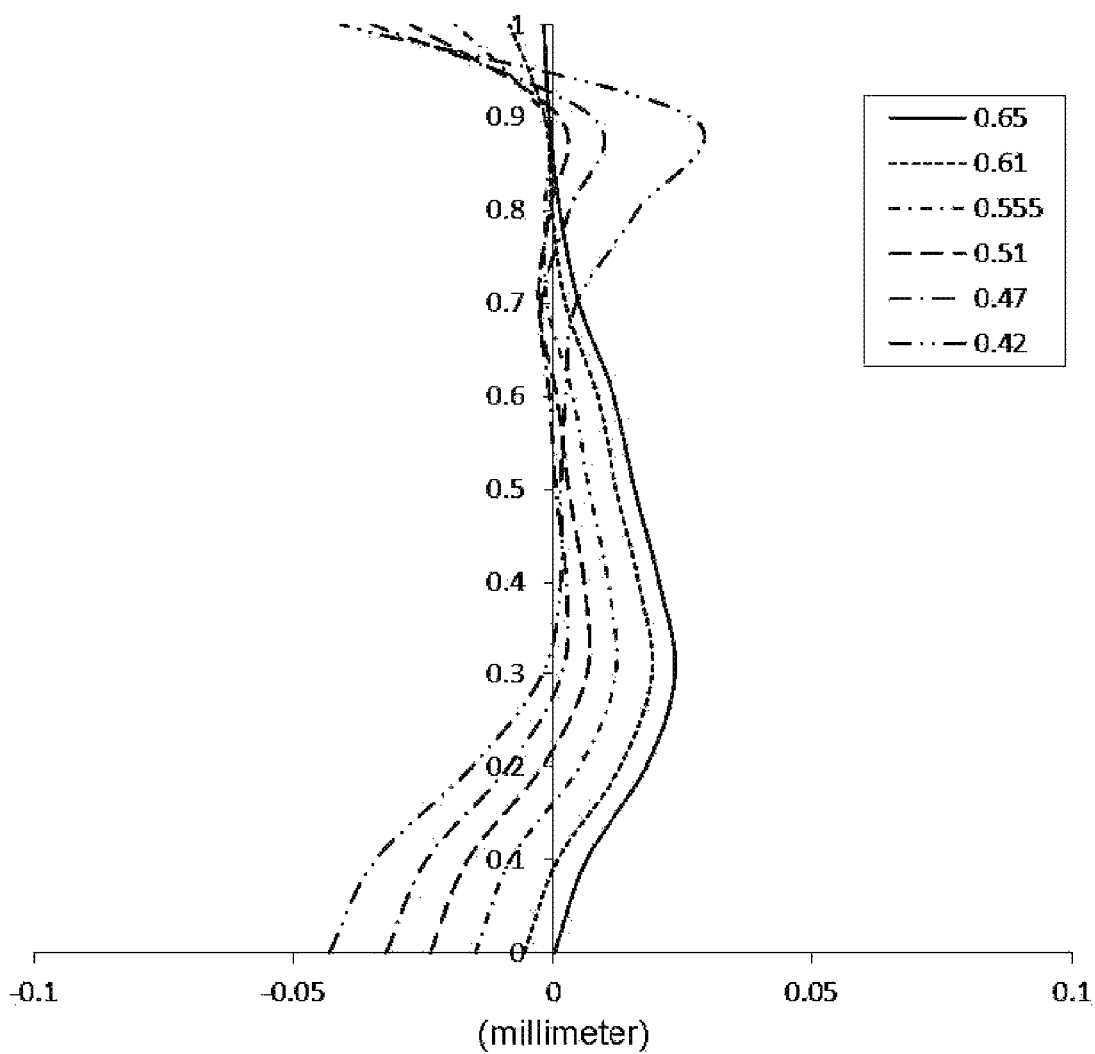
FIG. 6A to FIG. 6D illustrate a longitudinal aberration curve, astigmatism curve, distortion curve and lateral color curve of an optical imaging lens according to embodiment 3 respectively.
Figure 6B:
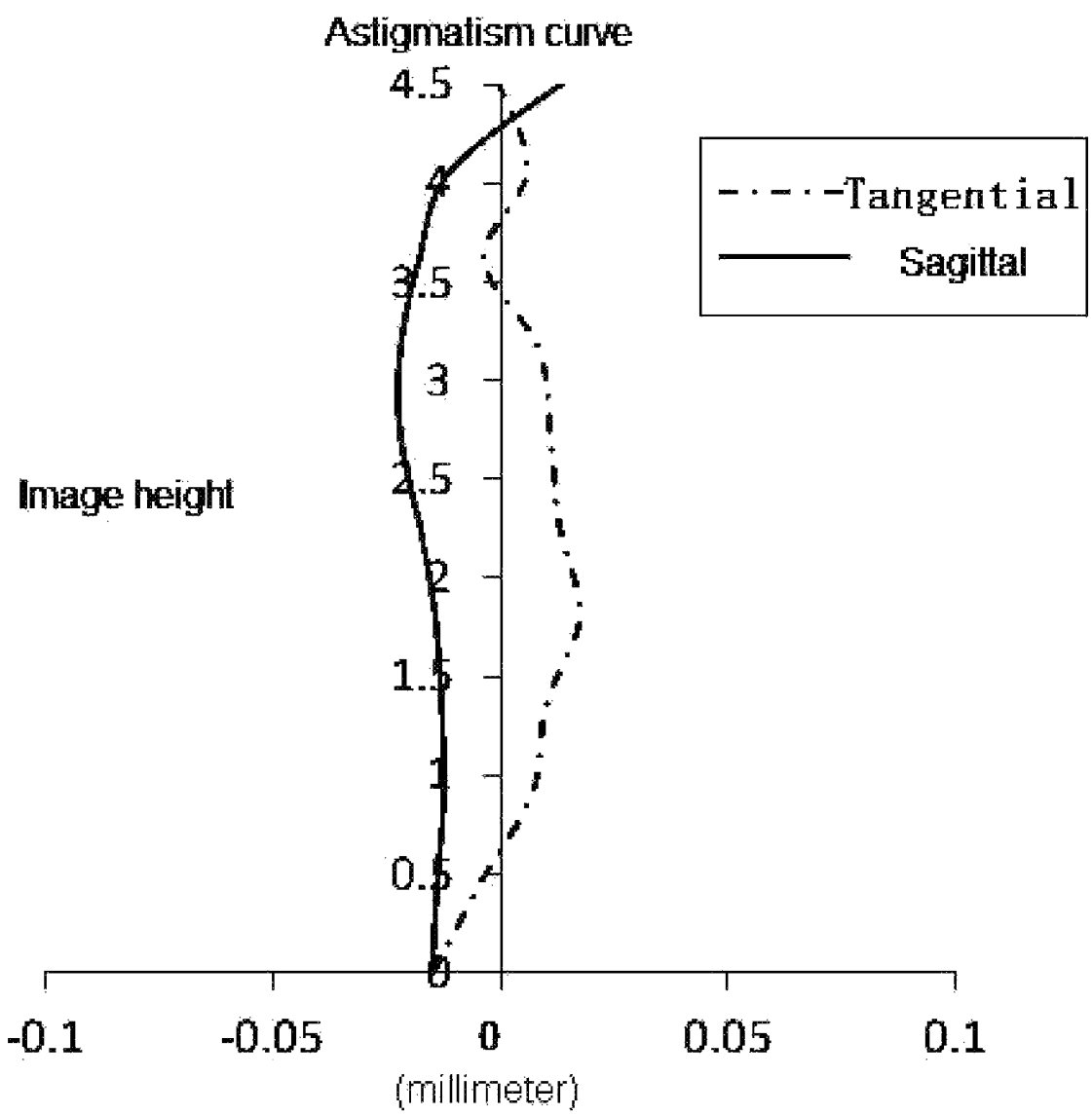
Figure 6C:
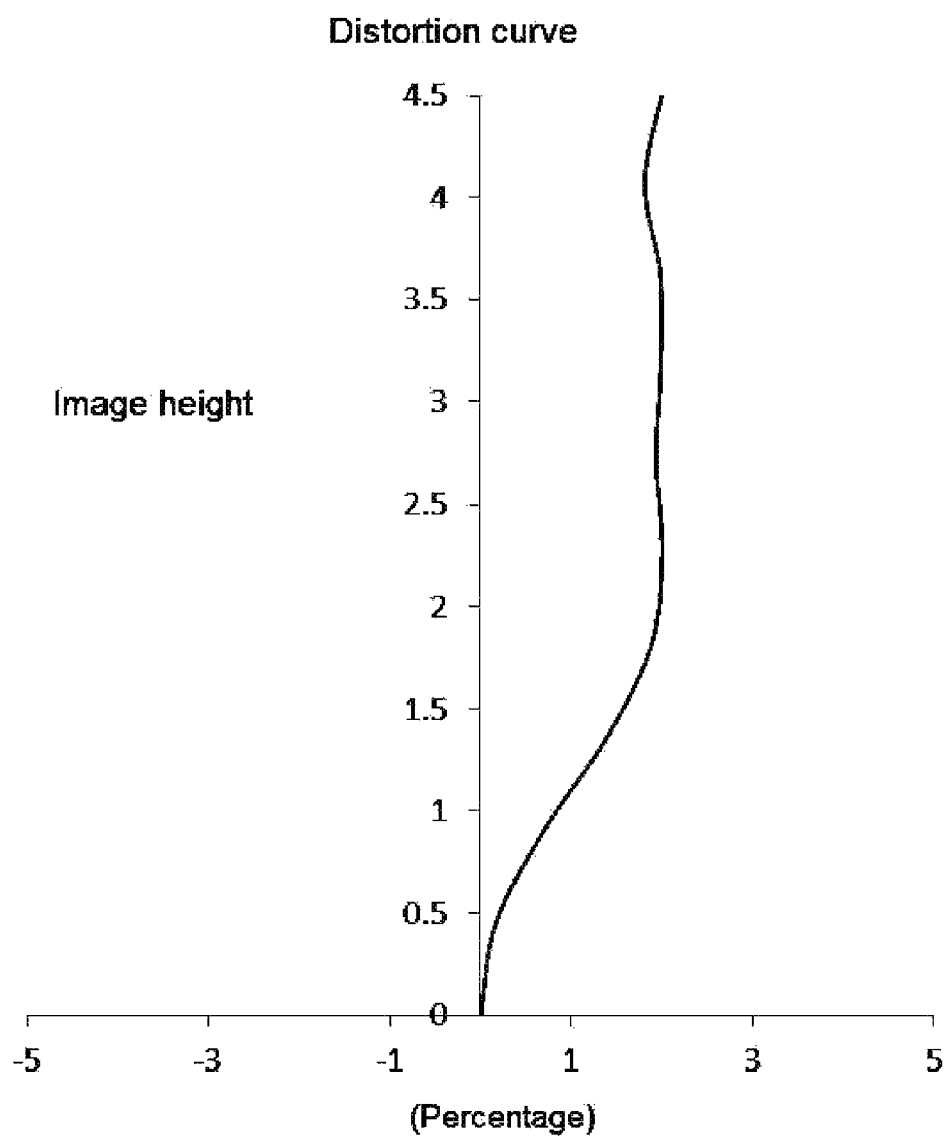
Figure 6D:
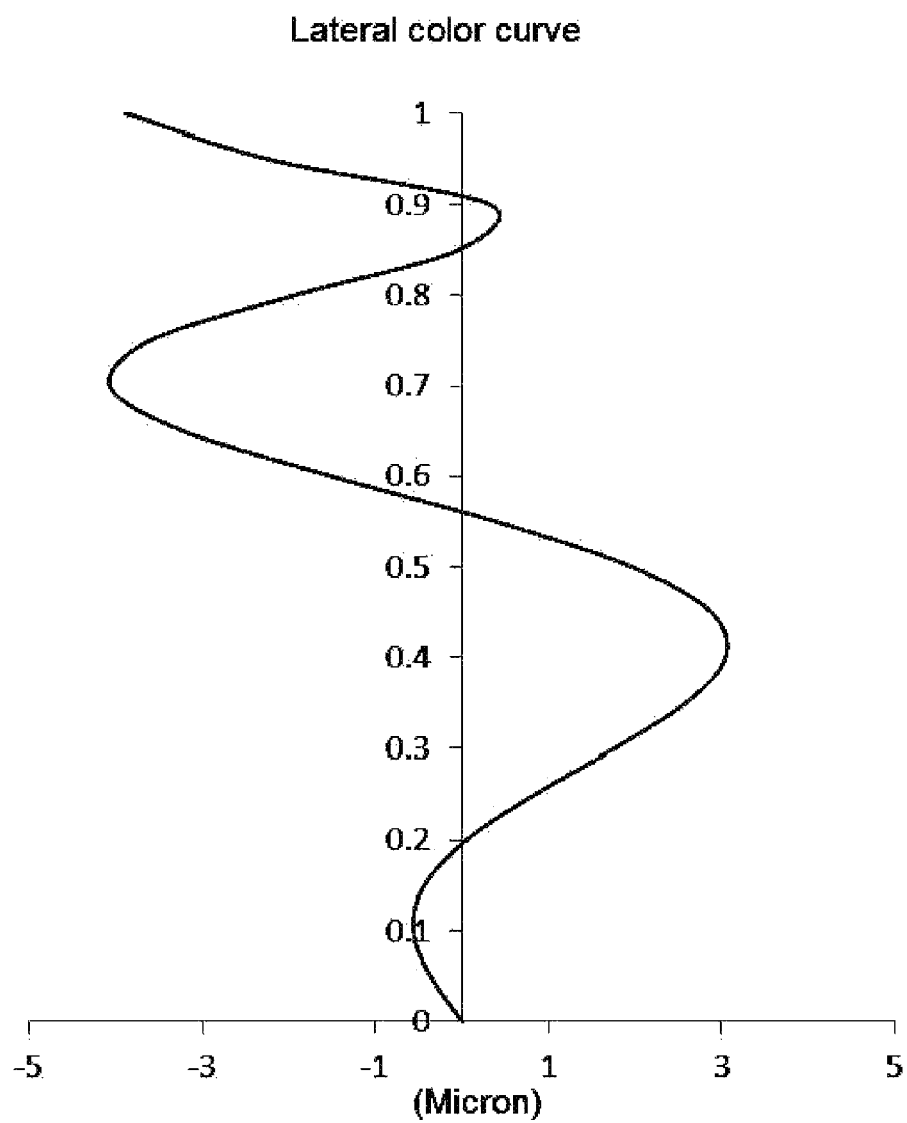

FIG. 6A illustrates a longitudinal aberration curve of the optical imaging lens according to embodiment 3 to represent the deviation of the convergence focal point after light with different wavelengths passes through the lens. FIG. 6B illustrates the astigmatism curve of the optical imaging lens according to embodiment 3 to represent the tangential image surface curvature and the sagittal image surface curvature. FIG. 6C illustrates the distortion curve of the optical imaging lens according to embodiment 3 to represent the distortion values corresponding to different image heights. FIG. 6D illustrates the lateral color curve of the optical imaging lens according to embodiment 3 to represent the deviation of different image heights on the imaging surface after the light passes through the lens. According to FIG. 6A to FIG. 6D, it can be seen that the optical imaging lens provided in embodiment 3 may achieve high imaging quality.

TABLE 5

| Surface number | Surface type | Curvature radius | Thickness | Material Refractive index | Abbe number | Focal length | Cone coefficient |
|---|---|---|---|---|---|---|---|
| OBJ | Spherical | Infinite | Infinite | | | | |
| STO | Spherical | Infinite | −0.5606 | | | | |
| S1 | Aspherical | 2.4833 | 0.6173 | 1.546 | 56.11 | 12.74 | −0.4015 |
| S2 | Aspherical | 3.5230 | 0.0922 | | | | −4.8976 |
| S3 | Aspherical | 3.6604 | 0.7200 | 1.546 | 56.11 | 8.07 | −0.1841 |
| S4 | Aspherical | 20.1694 | 0.0476 | | | | 70.0481 |
| S5 | Aspherical | 7.1093 | 0.3500 | 1.680 | 19.00 | −16.24 | −24.8247 |
| S6 | Aspherical | 4.2536 | 0.5270 | | | | 4.5234 |
| S7 | Aspherical | 39.3390 | 0.5143 | 1.680 | 19.00 | 56.55 | −68.6869 |
| S8 | Aspherical | −2920.2454 | 0.3015 | | | | 99.0000 |
| S9 | Aspherical | −4.7204 | 0.3000 | 1.546 | 56.11 | 8.52 | −19.4789 |
| S10 | Aspherical | −2.3946 | 0.0300 | | | | −9.6204 |
| S11 | Aspherical | −3.3276 | 0.4099 | 1.583 | 32.50 | 49.50 | −9.7565 |
| S12 | Aspherical | −3.1214 | 0.0300 | | | | −8.3247 |
| S13 | Aspherical | 29.0442 | 0.5038 | 1.680 | 19.00 | −12.12 | −99.0000 |
| S14 | Aspherical | 6.4211 | 0.4494 | | | | −31.4286 |
| S15 | Aspherical | 2.8047 | 0.7165 | 1.536 | 55.74 | −10.38 | −5.4511 |
| S16 | Aspherical | 1.6993 | 0.8275 | | | | −5.1649 |
| S17 | Spherical | Infinite | 0.2100 | 1.517 | 64.17 | | |
| S18 | Spherical | Infinite | 0.3309 | | | | |
| S19 | Spherical | Infinite | | | | | |

In embodiment 3, both the object-side surface and the image-side surface of any lens in the first lens E1 to the eighth lens E8 are aspheric surfaces. Table 6 shows the higher-order coefficients A4, A6, A8, A10, A12, A14, A16 and A18 applicable to the aspherical mirror surfaces S1-S16 in embodiment 3.

TABLE 6

| Surface number | A4 | A6 | A8 | A10 | A12 | A14 | A16 | A18 |
|---|---|---|---|---|---|---|---|---|
| S1 | −2.9092E−03 | 1.8256E−03 | −4.1457E−03 | 2.6960E−03 | −1.1586E−03 | 2.3250E−04 | −1.6553E−05 | 0.0000E+00 |
| S2 | 6.1269E−03 | −5.5353E−03 | 1.7935E−03 | −1.8469E−03 | 6.5916E−04 | −6.8904E−05 | 1.0416E−07 | 0.0000E+00 |
| S3 | −2.4597E−19 | 1.6261E−25 | −2.1903E−32 | 8.1155E−40 | 0.0000E+00 | 0.0000E+00 | 0.0000E+00 | 0.0000E+00 |
| S4 | −5.8845E−02 | 7.6092E−02 | −6.2037E−02 | 3.3874E−02 | −1.2813E−02 | 2.8974E−03 | −2.8094E−04 | 0.0000E+00 |
| S5 | −6.3355E−02 | 7.5140E−02 | −5.5465E−02 | 2.8337E−02 | −1.0237E−02 | 2.4499E−03 | −2.5913E−04 | 0.0000E+00 |
| S6 | −3.3283E−02 | 9.3573E−03 | 1.0200E−02 | −2.0993E−02 | 1.5638E−02 | −5.6343E−03 | 8.5402E−04 | 0.0000E+00 |
| S7 | −3.6928E−02 | 1.2433E−02 | −2.3015E−02 | 1.3126E−02 | −4.9367E−03 | 9.1347E−04 | 0.0000E+00 | 0.0000E+00 |
| S8 | −4.3406E−02 | 3.4462E−02 | −2.5435E−02 | 9.1059E−03 | −1.8893E−03 | 2.1116E−04 | 0.0000E+00 | 0.0000E+00 |
| S9 | −7.7204E−02 | 8.6424E−02 | −4.6897E−02 | 1.6366E−02 | −3.7619E−03 | 5.2846E−04 | −3.6672E−05 | 0.0000E+00 |
| S10 | −4.9680E−02 | 1.8980E−02 | −1.8516E−03 | 0.0000E+00 | 0.0000E+00 | 0.0000E+00 | 0.0000E+00 | 0.0000E+00 |
| S11 | −4.6140E−02 | 1.8558E−02 | −1.9746E−03 | 0.0000E+00 | 0.0000E+00 | 0.0000E+00 | 0.0000E+00 | 0.0000E+00 |
| S12 | −4.6663E−02 | 2.9203E−02 | −1.7132E−02 | 7.4383E−03 | −1.5237E−03 | 9.3671E−05 | 8.8284E−06 | −1.0239E−06 |
| S13 | 8.5310E−02 | −7.4463E−02 | 3.5108E−02 | −1.3319E−02 | 3.6872E−03 | −6.6381E−04 | 6.7503E−05 | −2.8826E−06 |
| S14 | 4.1354E−02 | −2.5202E−02 | 5.2800E−03 | −5.0628E−04 | −1.1245E−05 | 7.3901E−06 | −5.9277E−07 | 1.4371E−08 |
| S15 | −1.2976E−01 | 4.4237E−02 | −1.1568E−02 | 2.2371E−03 | −2.7656E−04 | 2.0312E−05 | −8.0676E−07 | 1.3318E−08 |
| S16 | −6.1227E−02 | 1.7538E−02 | −4.0396E−03 | 5.9239E−04 | −4.7591E−05 | 1.6472E−06 | 6.4205E−09 | −1.2742E−09 |

Embodiment 4

Figure 7:
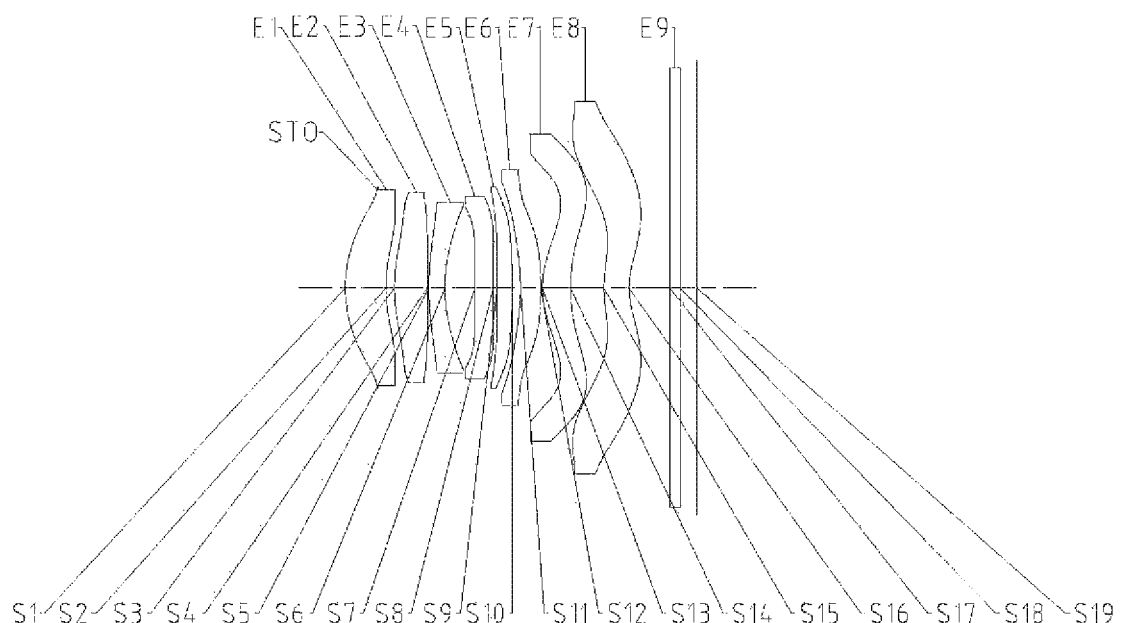
FIG. 7 is a structure diagram of an optical imaging lens according to embodiment 4 of the disclosure.

The optical imaging lens according to embodiment 4 of the disclosure will be described below with reference to FIG. 7 to FIG. 8D. FIG. 7 is a structure diagram of the optical imaging lens according to embodiment 4 of the disclosure;

As shown in FIG. 7, the optical imaging lens sequentially includes, from an object side to an image side along the optical axis, a diaphragm STO, the first lens E1, a second lens E2, a third lens E3, a fourth lens E4, a fifth lens E5, a sixth lens E6, a seventh lens E7, an eighth lens E8, a ninth element E9 and an imaging surface S19.

The first lens E1 has the positive refractive power, the object-side surface S1 thereof is a convex surface, and the image-side surface S2 is a concave surface. The second lens E2 has the positive refractive power, the object-side surface S3 thereof is a convex surface, and the image-side surface S4 is a concave surface. The third lens E3 has the negative refractive power, the object-side surface S5 thereof is a convex surface, and the image-side surface S6 is a concave surface. The fourth lens E4 has the positive refractive power, the object-side surface S7 thereof is a convex surface, and the image-side surface S8 is a convex surface. The fifth lens E5 has the positive refractive power, the object-side surface S9 thereof is a concave surface, and the image-side surface S10 is a convex surface. The sixth lens E6 has the negative refractive power, the object-side surface S11 thereof is a concave surface, and the image-side surface S12 is a convex surface. The seventh lens E7 has the positive refractive power, the object-side surface S13 thereof is a convex surface, and the image-side surface S14 is a concave surface. The eighth lens E8 has the negative refractive power, the object-side surface S15 thereof is a convex surface, and the image-side surface S16 is a concave surface. The optical filter E9 has the object-side surface S17 and the image-side surface S18. Light from an object sequentially penetrates through each of the surfaces S1 to S18 and is finally imaged on the imaging surface S19.

In the present embodiment, ImgH is a half of diagonal length of an effective pixel region on the imaging surface of the imaging surface S19, the total effective focal length of the optical imaging lens is equal to 5.48 mm, the ImgH is equal to 4.53 mm.

Table 7 shows basic parameters of the optical imaging lens of embodiment 4, in which the units of curvature radius, thickness/distance and focal length are millimeter (mm).

TABLE 7

| Surface number | Surface type | Curvature radius | Thickness | Material Refractive index | Abbe number | Focal length | Cone coefficient |
|---|---|---|---|---|---|---|---|
| OBJ | Spherical | Infinite | Infinite | | | | |
| STO | Spherical | Infinite | −0.6422 | | | | |
| S1 | Aspherical | 2.5852 | 0.8100 | 1.546 | 56.11 | 18.11 | 0.0000 |
| S2 | Aspherical | 3.1129 | 0.1695 | | | | −5.9301 |
| S3 | Aspherical | 3.2722 | 0.6579 | 1.546 | 56.11 | 6.63 | −9.2662 |
| S4 | Aspherical | 31.8341 | 0.0300 | | | | 27.1761 |
| S5 | Aspherical | 4.9979 | 0.3200 | 1.678 | 19.25 | −13.46 | −13.9668 |
| S6 | Aspherical | 3.1451 | 0.5990 | | | | 1.7655 |
| S7 | Aspherical | 55.4715 | 0.3640 | 1.680 | 19.00 | 79.31 | 99.0000 |
| S8 | Aspherical | −2920.2454 | 0.0759 | | | | −99.0000 |
| S9 | Aspherical | −25.9847 | 0.3000 | 1.546 | 56.11 | 108.39 | 49.1548 |
| S10 | Aspherical | −18.1295 | 0.1708 | | | | −99.0000 |
| S11 | Aspherical | −3.1071 | 0.4000 | 1.589 | 32.12 | −8.47 | −46.7345 |
| S12 | Aspherical | −8.5465 | 0.0300 | | | | 4.2816 |
| S13 | Aspherical | 1.6804 | 0.5635 | 1.546 | 56.11 | 5.22 | −10.1571 |
| S14 | Aspherical | 3.6078 | 0.6626 | | | | −46.3977 |
| S15 | Aspherical | 2.2475 | 0.5000 | 1.536 | 55.74 | −10.52 | −11.9605 |
| S16 | Aspherical | 1.4827 | 0.8160 | | | | −5.6404 |
| S17 | Spherical | Infinite | 0.2100 | 1.517 | 64.17 | | |
| S18 | Spherical | Infinite | 0.3309 | | | | |
| S19 | Spherical | Infinite | | | | | |

In embodiment 4, both the object-side surface and the image-side surface of any lens in the first lens E1 to the eighth lens E8 are aspheric surfaces. Table 8 shows the higher-order coefficients A4, A6, A8, A10, A12, A14, A16, A18 and A20 applicable to the aspherical mirror surfaces S1-S16 in embodiment 4.

TABLE 8

| Surface number | A4 | A6 | A8 | A10 | A12 | A14 | A16 | A18 | A20 |
|---|---|---|---|---|---|---|---|---|---|
| S1 | −6.4295E−03 | 2.4627E−03 | −6.0238E−03 | 5.6966E−03 | −3.3527E−03 | 1.1852E−03 | −2.4579E−04 | 2.2931E−05 | 4.9951E−07 |
| S2 | −2.9202E−03 | −1.5861E−02 | 5.1860E−03 | −1.0786E−03 | 2.4347E−04 | −4 0184E−05 | 3.1419E−06 | 0.0000E+00 | 0.0000E+00 |
| S3 | 9.2698E−03 | −2.6746E−02 | 9.2386E−03 | −8.5282E−04 | 0.0000E+00 | 0.0000E+00 | 0.0000E+00 | 0.0000E+00 | 0.0000E+00 |
| S4 | −3.8830E−02 | 3.6932E−02 | −2.1320E−02 | 7.2547E−03 | −1.6602E−03 | 2.4621E−04 | −1.7084E−05 | 0.0000E+00 | 0.0000E+00 |
| S5 | −3.5649E−02 | 3.6428E−02 | −9.2340E−03 | −5.9658E−03 | 3.5815E−03 | −6.2035E−04 | 3.3015E−05 | 0.0000E+00 | 0.0000E+00 |
| S6 | −2.9600E−02 | 2.8800E−03 | 1.1628E−02 | −1.4686E−02 | 6.6148E−03 | −1.4080E−03 | 1.2763E−04 | 0.0000E+00 | 0.0000E+00 |
| S7 | −9.5414E−03 | −1.9919E−02 | 8.1234E−03 | 6.3584E−04 | −1.9030E−03 | 4.1221E−04 | 0.0000E+00 | 0.0000E+00 | 0.0000E+00 |
| S8 | 4.6319E−02 | −6.6431E−02 | 3.1357E−02 | −7.6539E−03 | 7.4228E−04 | 5.8262E−06 | 0.0000E+00 | 0.0000E+00 | 0.0000E+00 |
| S9 | 4.4017E−02 | −3.6744E−02 | −2.5345E−03 | 1.1514E−02 | −4.7441E−03 | 8.3047E−04 | −5.6924E−05 | 0.0000E+00 | 0.0000E+00 |

TABLE 8-continued

| Surface number | A4 | A6 | A8 | A10 | A12 | A14 | A16 | A18 | A20 |
|---|---|---|---|---|---|---|---|---|---|
| S10 | 1.1611E−03 | −1.0184E−02 | 1.5546E−03 | 0.0000E+00 | 0.0000E+00 | 0.0000E+00 | 0.0000E+00 | 0.0000E+00 | 0.0000E+00 |
| S11 | −3.4784E−03 | −1.2646E−03 | 1.3572E−04 | 0.0000E+00 | 0.0000E+00 | 0.0000E+00 | 0.0000E+00 | 0.0000E+00 | 0.0000E+00 |
| S12 | −5.4716E−02 | 1.2077E−02 | 5.8096E−03 | −6.2313E−03 | 2.7432E−03 | −6.1484E−04 | 6.7819E−05 | −2.9357E−06 | 0.0000E+00 |
| S13 | 4.8817E−02 | −3.8771E−02 | 1.4445E−02 | −4.8894E−03 | 1.2422E−03 | −1.9929E−04 | 1.7531E−05 | −6.3467E−07 | 0.0000E+00 |
| S14 | 8.4426E−02 | −4.6503E−02 | 1.1969E−02 | −1.9984E−03 | 2.2391E−04 | −1.6854E−05 | 8.0065E−07 | −1.8115E−08 | 0.0000E+00 |
| S15 | −1.1280E−01 | 3.0373E−02 | −4.7080E−03 | 4.6478E−04 | −2.5664E−05 | 4.3636E−07 | 2.3487E−08 | −9.3382E−10 | 0.0000E+00 |
| S16 | −7.1096E−02 | 2.0559E−02 | −4.5027E−03 | 6.5786E−04 | −5.8062E−05 | 2.8205E−06 | −6.2206E−08 | 3.0101E−10 | 0.0000E+00 |

Figure 8A:
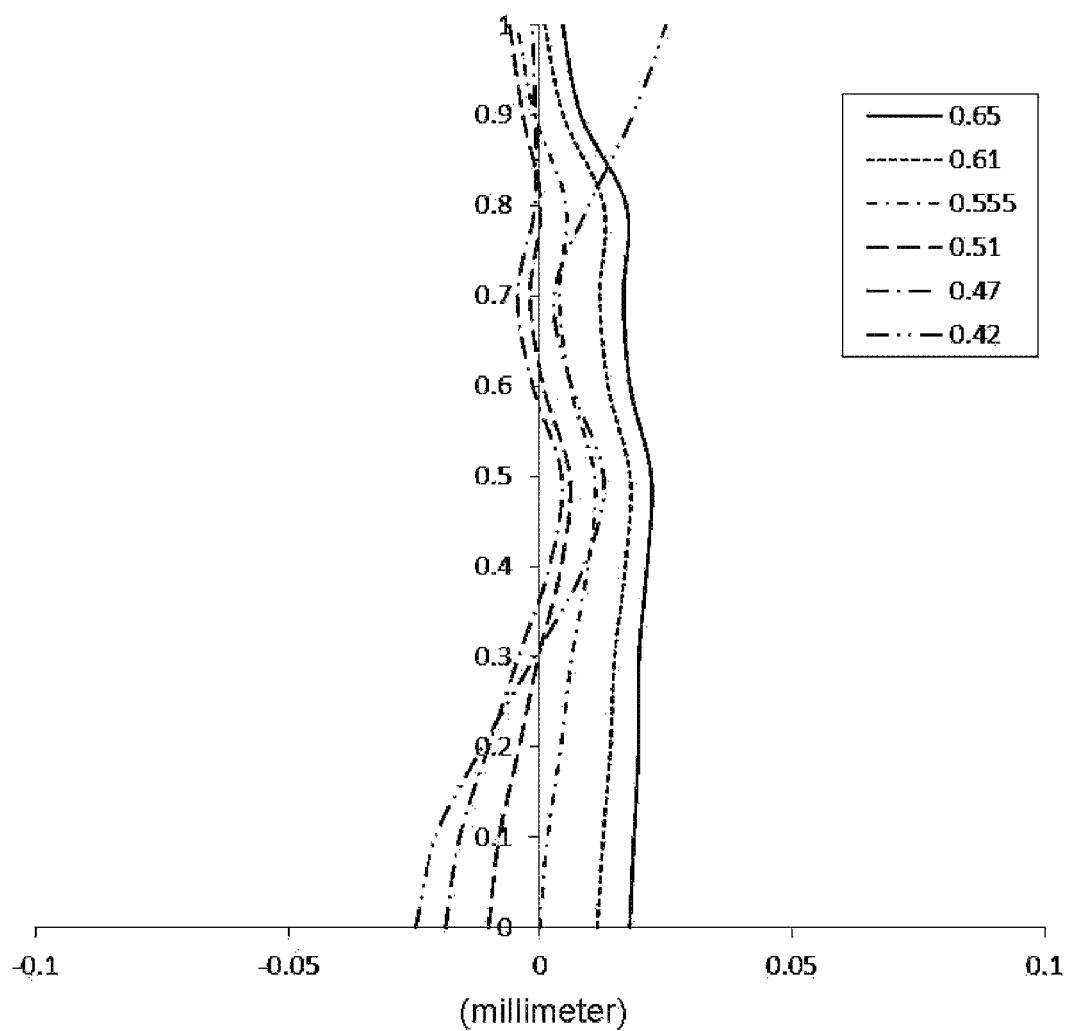
FIG. 8A to FIG. 8D illustrate a longitudinal aberration curve, astigmatism curve, distortion curve and lateral color curve of an optical imaging lens according to embodiment 4 respectively.
Figure 8B:
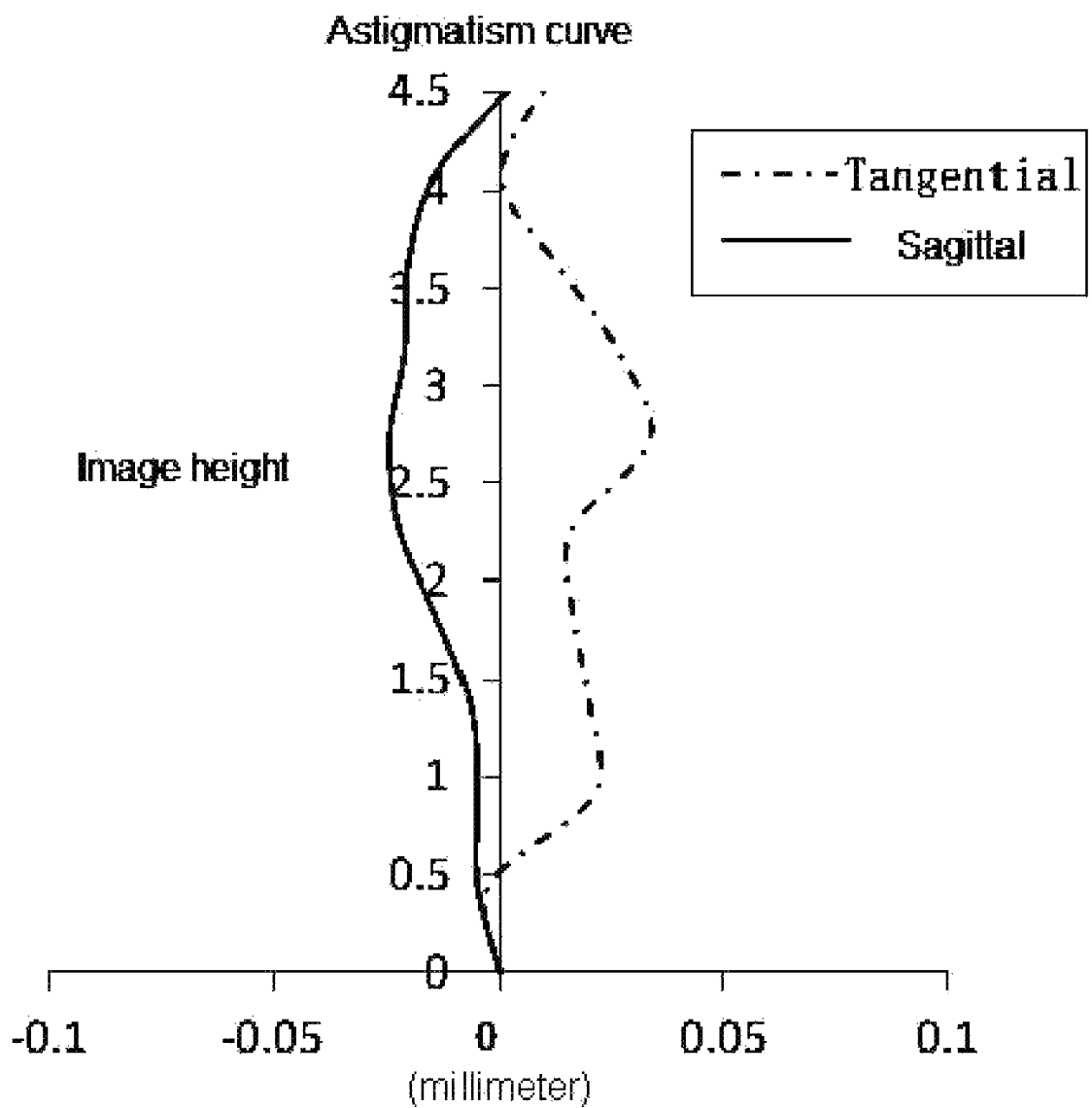
Figure 8C:
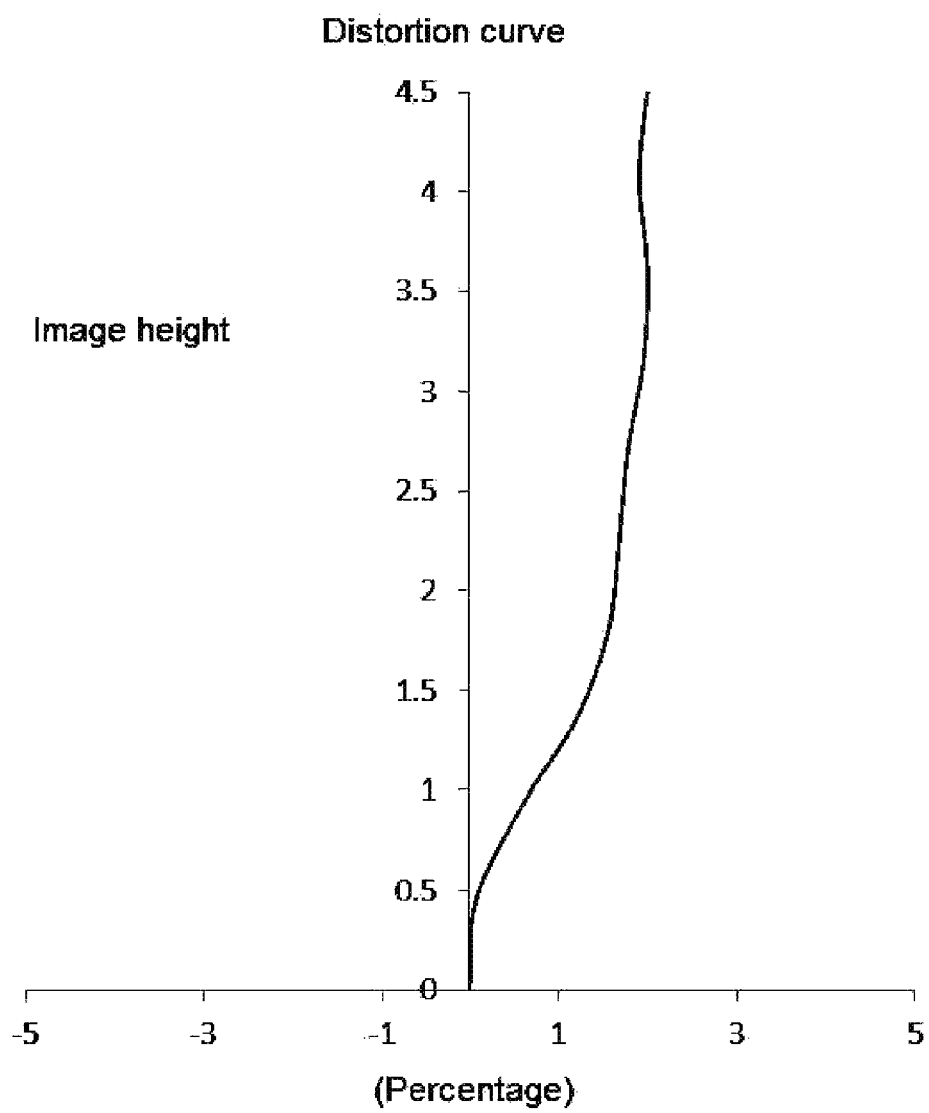
Figure 8D:
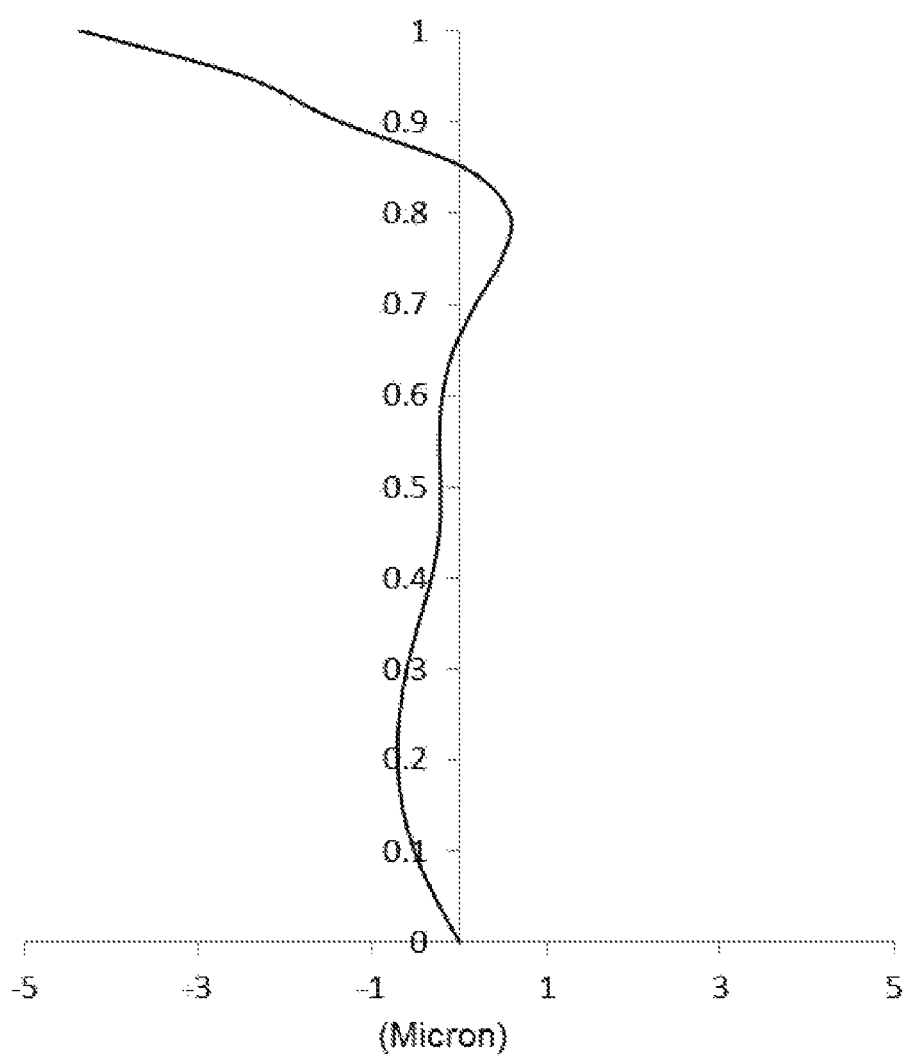

FIG. 8A illustrates a longitudinal aberration curve of the optical imaging lens according to embodiment 4 to represent the deviation of the convergence focal point after light with different wavelengths passes through the lens. FIG. 8B illustrates the astigmatism curve of the optical imaging lens according to embodiment 4 to represent the tangential image surface curvature and the sagittal image surface curvature. FIG. 8C illustrates the distortion curve of the optical imaging lens according to embodiment 4 to represent the distortion values corresponding to different image heights. FIG. 8D illustrates the lateral color curve of the optical imaging lens according to embodiment 4 to represent the deviation of different image heights on the imaging surface after the light passes through the lens. According to FIG. 8A to FIG. 8D, it can be seen that the optical imaging lens provided in embodiment 4 may achieve high imaging quality.

Embodiment 5

Figure 9:
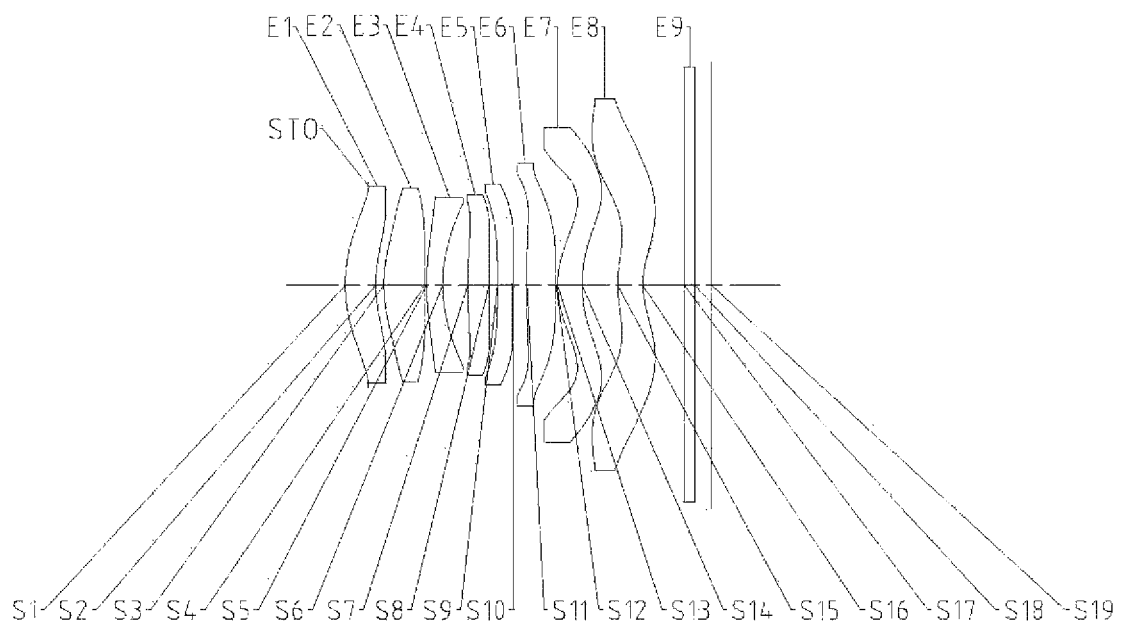
FIG. 9 is a structure diagram of an optical imaging lens according to embodiment 5 of the disclosure.

The optical imaging lens according to embodiment 5 of the disclosure will be described below with reference to FIG. 9 to FIG. 10D. FIG. 9 is a structure diagram of the optical imaging lens according to embodiment 5 of the disclosure;

As shown in FIG. 9, the optical imaging lens sequentially includes, from an object side to an image side along an optical axis, a diaphragm STO, a first lens E1, a second lens E2, a third lens E3, a fourth lens E4, a fifth lens E5, a sixth lens E6, a seventh lens E7, an eighth lens E8, a ninth element E9 and an imaging surface S19.

The first lens E1 has the positive refractive power, the object-side surface S1 thereof is a convex surface, and the image-side surface S2 is a concave surface. The second lens E2 has the positive refractive power, the object-side surface S3 thereof is a convex surface, and the image-side surface S4 is a concave surface. The third lens E3 has the negative refractive power, the object-side surface S5 thereof is a convex surface, and the image-side surface S6 is a concave surface. The fourth lens E4 has the positive refractive power, the object-side surface S7 thereof is a convex surface, and the image-side surface S8 is a convex surface. The fifth lens E5 has the negative refractive power, the object-side surface S9 thereof is a concave surface, and the image-side surface S10 is a concave surface. The sixth lens E6 has the negative refractive power, the object-side surface S11 thereof is a concave surface, and the image-side surface S12 is a concave surface. The seventh lens E7 has the positive refractive power, the object-side surface S13 thereof is a convex surface, and the image-side surface S14 is a concave surface. The eighth lens E8 has the negative refractive power, the object-side surface S15 thereof is a convex surface, and the image-side surface S16 is a concave surface. The optical filter E9 has the object-side surface S17 and the image-side surface S18. Light from an object sequentially penetrates through each of the surfaces S1 to S18 and is finally imaged on the imaging surface S19.

In the present embodiment, ImgH is a half of diagonal length of an effective pixel region on the imaging surface of the imaging surface S19, the total effective focal length of the optical imaging lens is equal to 5.51 mm, and the ImgH is equal to 4.48 mm.

Table 9 shows basic parameters of the optical imaging lens of embodiment 5, in which the units of curvature radius, thickness/distance and focal length are millimeter (mm).

TABLE 9

| Surface number | Surface type | Curvature radius | Thickness | Refractive index | Abbe number | Focal length | Cone coefficient |
|---|---|---|---|---|---|---|---|
| OBJ | Spherical | Infinite | Infinite | | | | |
| STO | Spherical | Infinite | −0.4627 | | | | |
| S1 | Aspherical | 2.9220 | 0.6094 | 1.546 | 56.11 | 66.25 | 0.0000 |
| S2 | Aspherical | 2.9447 | 0.1601 | | | | −5.6914 |
| S3 | Aspherical | 2.9243 | 0.8200 | 1.546 | 56.11 | 5.46 | −7.4612 |
| S4 | Aspherical | 141.2843 | 0.0300 | | | | 73.0741 |
| S5 | Aspherical | 4.4282 | 0.3200 | 1.678 | 19.25 | −11.28 | −40.6279 |
| S6 | Aspherical | 2.7217 | 0.5043 | | | | 0.7877 |
| S7 | Aspherical | 12.6515 | 0.4224 | 1.546 | 56.11 | 19.37 | −0.8766 |
| S8 | Aspherical | −63.5789 | 0.1718 | | | | 21.7704 |
| S9 | Aspherical | −19.1219 | 0.3000 | 1.678 | 19.25 | −13.54 | 99.0000 |
| S10 | Aspherical | 17.7518 | 0.2844 | | | | 14.3130 |
| S11 | Aspherical | −32.4692 | 0.5779 | 1.584 | 33.73 | −44.21 | −99.0000 |
| S12 | Aspherical | 130.4000 | 0.0300 | | | | 99.0000 |
| S13 | Aspherical | 1.8518 | 0.4927 | 1.603 | 28.78 | 6.36 | −7.1522 |
| S14 | Aspherical | 3.2017 | 0.7031 | | | | −14.0588 |
| S15 | Aspherical | 2.2169 | 0.5000 | 1.536 | 55.74 | −11.26 | −6.5898 |
| S16 | Aspherical | 2.9220 | 0.8330 | | | | −3.8027 |
| S17 | Spherical | Infinite | 0.2100 | 1.517 | 64.17 | | |

TABLE 9-continued

| Surface number | Surface type | Curvature radius | Thickness | Material Refractive index | Abbe number | Focal length | Cone coefficient |
|---|---|---|---|---|---|---|---|
| S18 | Spherical | Infinite | 0.3309 | | | | |
| S19 | Spherical | Infinite | | | | | |

In embodiment 5, both the object-side surface and the image-side surface, of any lens in the first lens E1 to the eighth lens E8 are aspheric surfaces. Table 10 shows the higher-order coefficients A4, A6, A8, A10, A12, A14, A16, A18 and A20 applicable to the aspherical mirror surfaces S1-S16 in embodiment 5.

TABLE 10

| Surface Number | A4 | A6 | A8 | A10 | A12 | A14 | A16 | A18 | A20 |
|---|---|---|---|---|---|---|---|---|---|
| S1 | −1.0643E−02 | 3.9444E−05 | −1.7647E−03 | 1.0567E−03 | −4.1685E−04 | 3.8994E−05 | 2.2019E−05 | −7.3431E−06 | 9.3123E−07 |
| S2 | −5.4676E−03 | −1.5018E−02 | 7.4866E−03 | −6.5042E−03 | 4.6675E−03 | −1.8139E−03 | 3.8391E−04 | −4.1653E−05 | 1.7719E−06 |
| S3 | 1.7747E−02 | −2.1639E−02 | 9.7125E−03 | −8.4135E−03 | 5.7417E−03 | −1.8479E−03 | 2.5370E−04 | −4.8267E−06 | −1.3614E−06 |
| S4 | −9.8489E−03 | 1.9652E−03 | −8.5852E−03 | 8.1486E−03 | −3.6959E−03 | 9.4503E−04 | −1.4959E−04 | 1.6244E−05 | −1.0544E−06 |
| S5 | 1.9304E−02 | −3.4914E−02 | 2.7346E−02 | −1.1096E−02 | 2.0957E−03 | −1.0109E−04 | −1.0024E−05 | 0.0000E+00 | 0.0000E+00 |
| S6 | −3.6306E−02 | 6.5799E−03 | −2.2217E−03 | 2.6932E−03 | −2.2506E−03 | 7.4071E−04 | −8.6717E−05 | 0.0000E+00 | 0.0000E+00 |
| S7 | 4.0551E−03 | −4.9897E−03 | −4.8538E−03 | 3.7116E−03 | −1.2114E−03 | 1.4435E−04 | 0.0000E+00 | 0.0000E+00 | 0.0000E+00 |
| S8 | 3.3545E−02 | −2.6746E−02 | 7.9926E−03 | −2.1452E−03 | 3.3431E−04 | −1.2548E−05 | 0.0000E+00 | 0.0000E+00 | 0.0000E+00 |
| S9 | 1.8678E−02 | −4.6160E−02 | 3.1740E−02 | −1.3318E−02 | 3.5985E−03 | −5.5425E−04 | 3.6907E−05 | 0.0000E+00 | 0.0000E+00 |
| S10 | 3.8960E−03 | −3.4950E−02 | 1.8238E−02 | −5.8977E−03 | 1.4483E−03 | −2.3934E−04 | 1.7838E−05 | 0.0000E+00 | 0.0000E+00 |
| S11 | 4.8430E−02 | −2.4051E−02 | 4.5294E−03 | −5.6256E−04 | 3.7333E−05 | 0.0000E+00 | 0.0000E+00 | 0.0000E+00 | 0.0000E+00 |
| S12 | −7.6901E−02 | 4.6961E−02 | −1.9457E−02 | 4.3361E−03 | −2.3933E−04 | −1.5283E−04 | 4.8037E−05 | −5.8700E−06 | 2.6565E−07 |
| S13 | 5.4527E−02 | −4.2325E−02 | 1.9753E−02 | −1.0409E−02 | 3.8548E−03 | −8.6770E−04 | 1.1409E−04 | −8.0374E−06 | 2.3374E−07 |
| S14 | 8.2501E−02 | −3.8944E−02 | 3.5036E−03 | 1.7123E−03 | −6.6177E−04 | 1.0852E−04 | −9.5964E−06 | 4.4381E−07 | −8.4070E−09 |
| S15 | −1.1887E−01 | 3.1180E−02 | −6.1435E−03 | 1.1873E−03 | −1.7894E−04 | 1.7676E−05 | −1.0632E−06 | 3.5440E−08 | −5.0360E−10 |
| S16 | −9.1251E−02 | 3.0844E−02 | −8.4184E−03 | 1.5841E−03 | −1.8742E−04 | 1.3438E−05 | −5.5348E−07 | 1.1540E−08 | −8.5024E−11 |

Figure 10A:
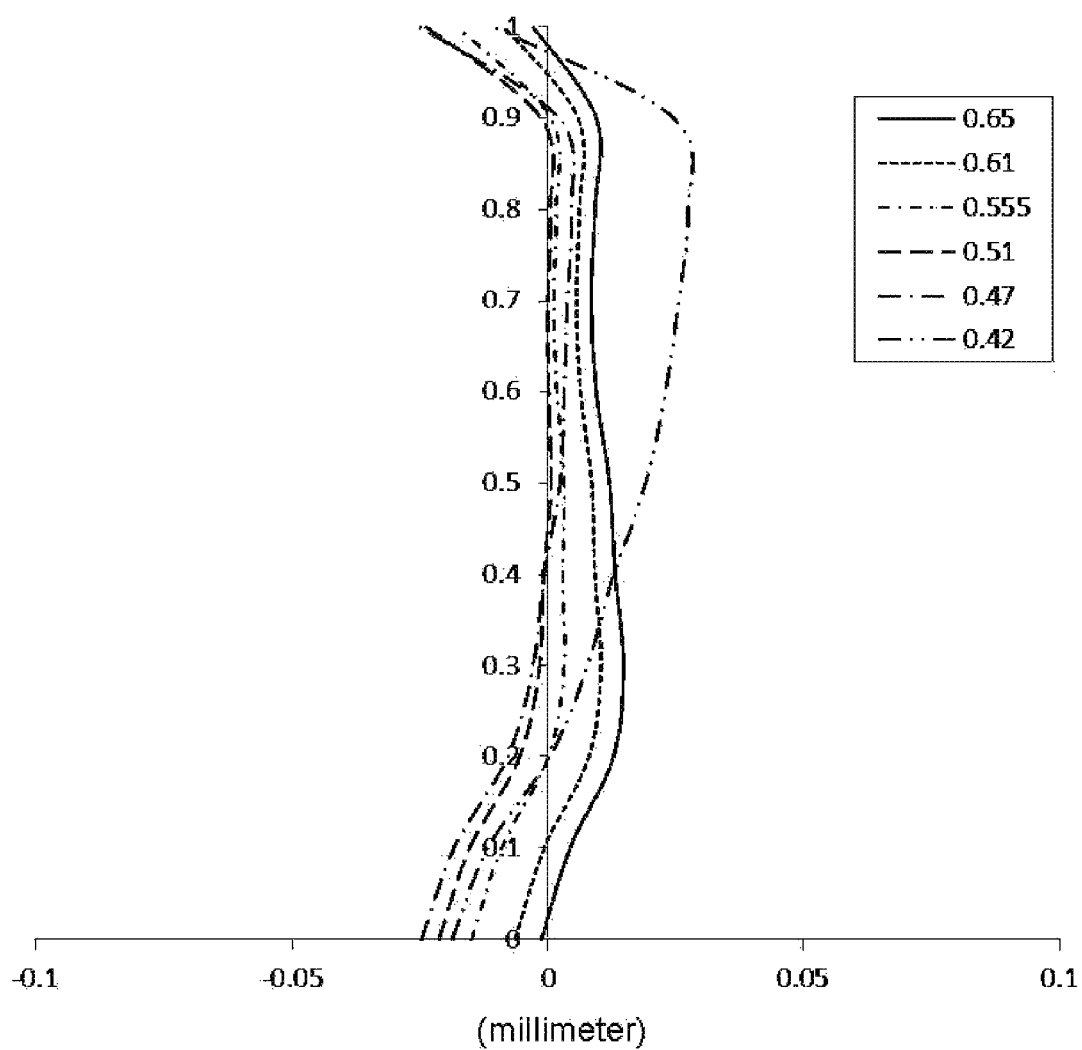
FIG. 10A to FIG. 10D illustrate a longitudinal aberration curve, astigmatism curve, distortion curve and lateral color curve of an optical imaging lens according to embodiment 5 respectively.
Figure 10B:
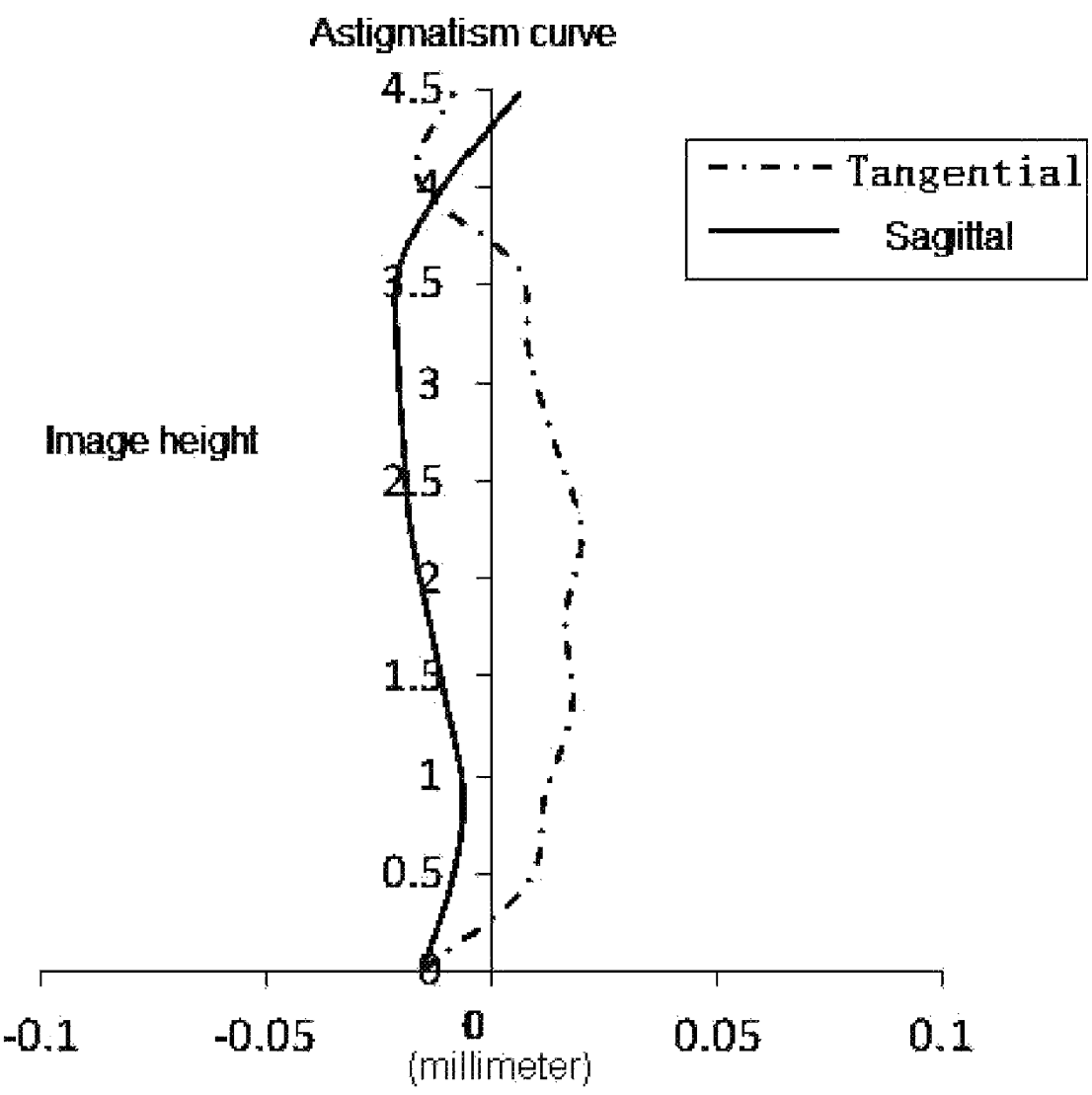
Figure 10C:
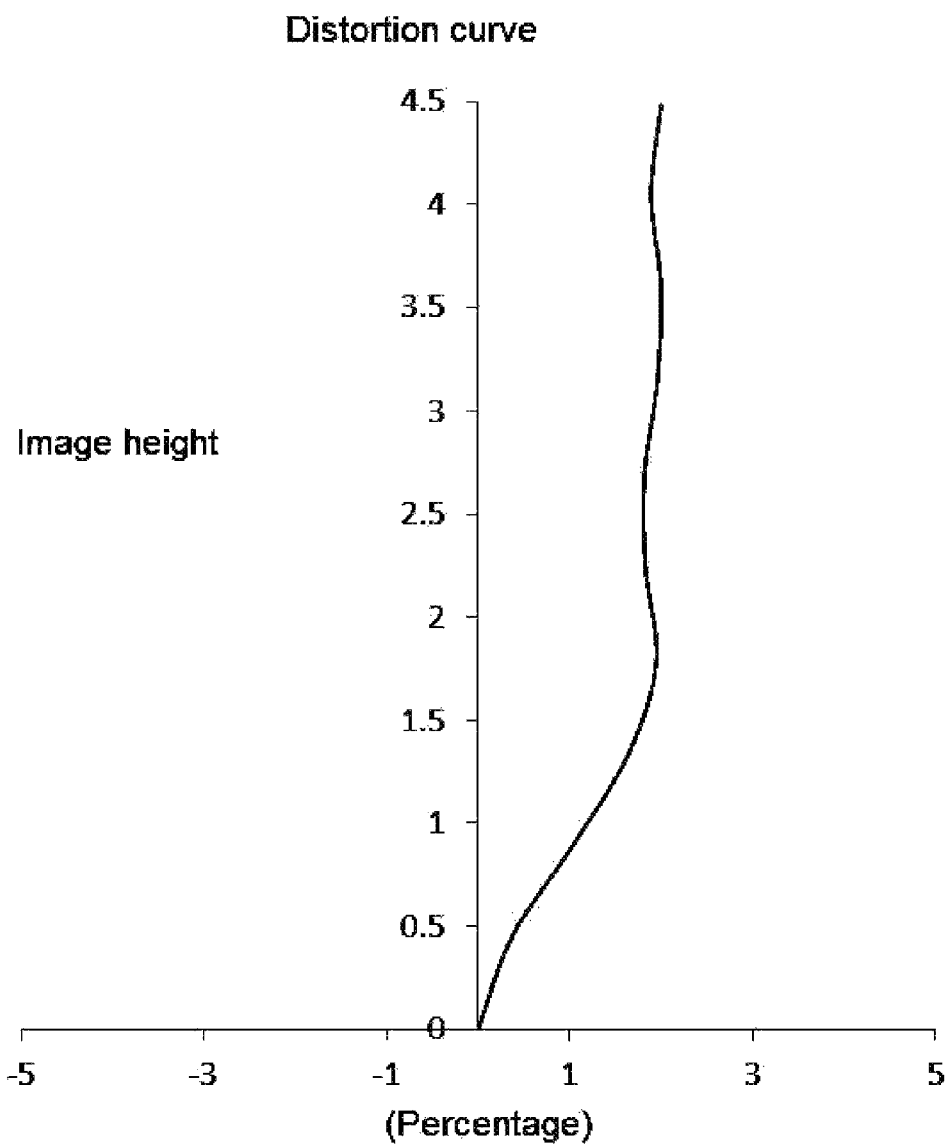
Figure 10D:
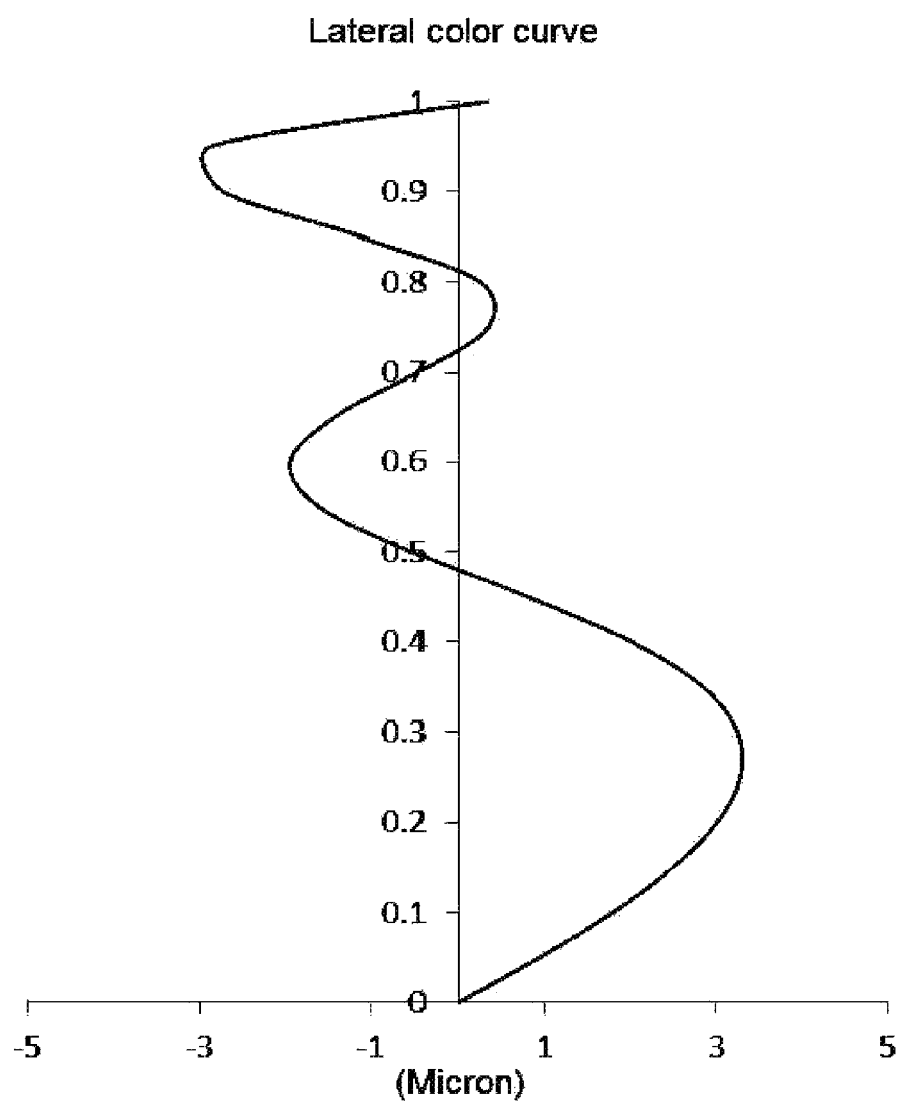

FIG. 10A illustrates a longitudinal aberration curve of the optical imaging lens according to embodiment 5 to represent the deviation of the convergence focal point after light with different wavelengths passes through the lens. FIG. 10B illustrates the astigmatism curve of the optical imaging lens according to embodiment 5 to represent the tangential image surface curvature and the sagittal image surface curvature. FIG. 10C illustrates the distortion curve of the optical imaging lens according to embodiment 5 to represent the distortion values corresponding to different image heights. FIG. 10D illustrates the lateral color curve of the optical imaging lens according to embodiment 5 to represent the deviation of different image heights on the imaging surface after the light passes through the lens. According to FIG. 10A to FIG. 10D, it can be seen that the optical imaging lens provided in embodiment 5 may achieve high imaging quality.

To sum up, embodiment 1 to embodiment 5 meet the relationship shown in Table 11 respectively.

TABLE 11

| | embodiments | | | | |
|---|---|---|---|---|---|
| Conditional form | 1 | 2 | 3 | 4 | 5 |
| TTL/(EPD × ImgH) (mm$^{-1}$) | 0.41 | 0.41 | 0.44 | 0.40 | 0.41 |
| f/R8 + f/R9 | −0.46 | −0.47 | −1.18 | −0.21 | −0.37 |
| R7/R8 | −0.70 | −0.55 | −0.01 | −0.02 | −0.20 |
| f4/f3 | −2.08 | −1.78 | −3.48 | −5.89 | −1.72 |
| f7/f8 | −0.38 | −0.56 | −1.17 | −0.50 | −0.57 |

TABLE 11-continued

| | embodiments | | | | |
|---|---|---|---|---|---|
| Conditional form | 1 | 2 | 3 | 4 | 5 |
| f/(R2 − R1) | 31.79 | 16.37 | 5.35 | 10.38 | 242.73 |
| f/R4 | 0.04 | 0.06 | 0.28 | 0.17 | 0.04 |
| (R4 − R5)/(R4 + R5) | 0.93 | 0.91 | 0.48 | 0.73 | 0.94 |
| (R6 − R7)/(R6 − R7) | −1.34 | −1.42 | −1.24 | −1.12 | −1.55 |
| f/CT1 | 7.74 | 7.77 | 9.02 | 6.77 | 9.04 |
| f2/CT2 | 7.70 | 8.31 | 11.21 | 10.07 | 6.66 |
| f/|f5| + f/|f6| | 0.77 | 0.54 | 0.77 | 0.70 | 0.53 |
| T34/CT4 | 1.16 | 1.15 | 1.02 | 1.65 | 1.19 |
| CT5/T45 | 2.14 | 1.57 | 1.00 | 3.95 | 1.75 |
| (CT6 + CT7 + CT8)/3 (mm) | 0.54 | 0.53 | 0.54 | 0.49 | 0.52 |
| V6/V7 | 0.91 | 1.22 | 1.71 | 0.57 | 1.17 |
| |V4 − V5|/V6 | 1.23 | 1.12 | 1.14 | 1.16 | 1.09 |

The above description is only description about the preferred embodiments of the disclosure and adopted technical principles. Those skilled in the art should know that the scope of invention involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. An optical imaging lens, sequentially comprising from an object side to an image side along an optical axis:
a first lens with refractive power;
a second lens with positive refractive power;
a third lens with negative refractive power;
a fourth lens with refractive power;
a fifth lens with refractive power;
a sixth lens with refractive power;
a seventh lens with refractive power; and
an eighth lens with negative refractive power;
wherein, a distance TTL on the optical axis from an object-side surface of the first lens to an imaging surface of the optical imaging lens, ImgH is a half of diagonal length of an effective pixel region on the imaging surface of the optical imaging lens, ImgH and an Entrance Pupil Diameter (EPD) of the optical imaging lens meet $TTL/(EPD \times ImgH) < 0.5$ mm$^{-1}$; and
a total effective focal length f of the optical imaging lens, a curvature radius R8 of an image-side surface of the fourth lens and a curvature radius R9 of an object-side surface of the fifth lens meet $-2.0 < f/R8 + f/R9 < 0$;
an abbe number V4 of the fourth lens, an abbe number V5 of the fifth lens and an abbe number V6 of the sixth lens meet $1 \leq |V4-V5|/V6 < 1.5$.

2. The optical imaging lens as claimed in claim 1, wherein a curvature radius R7 of an object-side surface of the fourth lens and the curvature radius R8 of the image-side surface of the fourth lens meet:

$-1.0 < R7/R8 < 0$.

3. The optical imaging lens as claimed in claim 1, wherein an effective focal length f4 of the fourth lens and an effective focal length f3 of the third lens meet:

$f4/f3 < -1.5$.

4. The optical imaging lens as claimed in claim 1, wherein an effective focal length f7 of the seventh lens and an effective focal length f8 of the eighth lens meet:

$1.5 < f7/f8 < 0$.

5. The optical imaging lens as claimed in claim 1, wherein the total effective focal length f of the optical imaging lens, a curvature radius R2 of an image-side surface of the first lens, and a curvature radius R1 of the object-side surface of the first lens meet:

$f/(R2-R1) \geq 5.0$.

6. The optical imaging lens as claimed in claim 1, wherein the total effective focal length f of the optical imaging lens and a curvature radius R4 of an image-side surface of the second lens meet:

$0 < f/R4 < 0.5$.

7. The optical imaging lens as claimed in claim 1, wherein a curvature radius R4 of an image-side surface of the second lens and a curvature radius R5 of an object-side surface of the third lens meet:

$0 < (R4-R5)/(R4+R5) \leq 1.0$.

8. The optical imaging lens as claimed in claim 1, wherein a curvature radius R6 of an image-side surface of the third lens and a curvature radius R7 of an object-side surface of the fourth lens meet:

$-2.0 < (R6+R7)/(R6-R7) < -1.0$.

9. The optical imaging lens as claimed in claim 1, wherein the total effective focal length f of the optical imaging lens and a Center Thickness CT1 of the first lens on the optical axis meet:

$6.0 \leq f/CT1 < 10$.

10. The optical imaging lens as claimed in claim 1, wherein an effective focal length f2 of the second lens and a center thickness CT2 of the second lens on the optical axis meet $6 < f2/CT2 < 15$.

11. The optical imaging lens as claimed in claim 1, wherein the total effective focal length f of the optical imaging lens, an effective focal length f5 of the fifth lens, and an effective focal length f6 of the sixth lens meet $0.5 \leq f/|f5| + f/|f6| < 1.0$.

12. The optical imaging lens as claimed in claim 1, wherein a distance T34 between the third lens and the fourth lens on the optical axis and a center thickness CT4 of the fourth lens on the optical axis meet $1 \leq T34/CT4 < 2$.

13. The optical imaging lens as claimed in claim 1, wherein a center thickness CT5 of the fifth lens on the optical axis and a distance T45 between the fourth lens and the fifth lens on the optical axis meet $1 CT5/T45 < 5$.

14. The optical imaging lens as claimed in claim 1, wherein a center thickness CT6 of the sixth lens on the optical axis, a center thickness CT7 of the seventh lens on the optical axis and a center thickness CT8 of the eighth lens on the optical axis meet $0.45$ mm $< (CT6+CT7+CT8)/3 < 0.6$ mm.

15. The optical imaging lens as claimed in claim 1, wherein an abbe number V6 of the sixth lens and an abbe number V7 of the seventh lens meet $0.5 \leq V6/V7 < 2 0.0$.

* * * * *